United States Patent [19]
Spear et al.

[11] Patent Number: 6,138,927
[45] Date of Patent: Oct. 31, 2000

[54] DUAL MODE SPREADER

[75] Inventors: Kenneth J. Spear, Vienna, W. Va.;
Steven F. Brooker, Marietta, Ohio

[73] Assignee: O. Ames Co., Parkersburg, W. Va.

[21] Appl. No.: 09/259,329

[22] Filed: Mar. 1, 1999

[51] Int. Cl.[7] .................................................. A01C 17/00
[52] U.S. Cl. ............................................ 239/666; 239/687
[58] Field of Search .................................. 239/664–666, 239/681, 683–687, 689; 222/609, 625; 403/157, 150, 110

[56] References Cited

U.S. PATENT DOCUMENTS

| | | | |
|---|---|---|---|
| 2,839,223 | 6/1958 | Liljenberg | 222/625 |
| 3,847,488 | 11/1974 | Gossage | 403/110 X |
| 4,032,074 | 6/1977 | Amerine | 239/687 X |
| 4,106,704 | 8/1978 | McRoskey et al. | 222/625 X |
| 4,671,434 | 6/1987 | Johnston et al. | 222/625 |
| 4,929,113 | 5/1990 | Sheu | 403/157 |
| 5,288,017 | 2/1994 | Havlovitz | 239/687 |
| 5,370,321 | 12/1994 | Bianco | 239/685 X |
| 5,525,001 | 6/1996 | Perkins | 403/157 |
| 5,570,814 | 11/1996 | Havlovitz | 222/625 X |
| 5,597,092 | 1/1997 | Havlovitz | 222/625 X |
| 5,607,079 | 3/1997 | DeLaby et al. | 222/625 X |

*Primary Examiner*—Lesley D. Morris
*Attorney, Agent, or Firm*—W. Warren Taltavull; Farkas & Manelli PLLC

[57] ABSTRACT

A dual mode spreader includes a wheel supported container having a bottom wall provided with discharge openings feeding to a rotationally supported spreader disk; a skirt is mounted relative to the container to be movable to alter the distribution pattern between a broadcast mode and a drop mode; a mode determining member is provided to move with respect to the container in coordination with movement of the skirt between the broadcast and drop modes of operation.

34 Claims, 10 Drawing Sheets

DUAL MODE SPREADER

This invention generally relates to a mechanism for distributing a spreadable particulate material on a selected ground area and more particularly to a dual mode spreader that can distribute the spreadable material in both a broadcast mode to distribute the material outwardly from the spreader in a less controlled pattern over a relatively wide area and a drop mode to release the material downwardly from the spreader in a controlled pattern over a narrower area.

BACKGROUND OF THE INVENTION

Mechanisms for spreading particulate matter over a ground surface are well known and in common use. Material spreaders can be classified in two general categories: broadcast spreaders and drop spreaders. Drop spreaders discharge material directly downwardly on a soil or other type of surface from a series of apertures in a container structure that holds the material to be spread. Typically as the containment structure is propelled along the ground, a mechanical member disposed above the apertures moves in coordinated relation with the rotation of the wheels on the spreader to sift and meter the material through the apertures for even distribution on the ground. Typically the apertures and the mechanical member extend the transverse width of the containment structure.

Broadcast spreaders typically disperse particles outwardly from a containment structure by dropping the same from a plurality of large apertures in the containment structure onto a rapidly rotating structure rotating in a plane generally parallel to the ground. More particularly, in a typical walk-behind spreader, the apertures are positioned to drop the material on a rearward portion of the rotating structure so that the material is thrown outwardly generally forwardly and to the sides of the container structure and is not thrown rearwardly on the spreader user. The rotating structure is constructed and arranged to throw the particles outwardly from the spreader over an area wider than the width of the spreader.

The drop spreaders and broadcast spreaders offer the user certain advantages and disadvantages. Uniform application of material is critical for certain pesticides and some herbicides and drop spreaders spread particulate matter in a highly uniform pattern over a path the transverse width of which is essentially the width of the spreader. The uniformity of distribution afforded by drop spreaders does not depend on particle size or density, the travel speed of the spreader or, because drop spreaders are typically low to the ground, wind conditions.

Drop spreaders have several disadvantages, however. Because the path width of the applied material is limited to the width of the spreader, drop spreaders are typically slower in covering a ground area of a given size with material compared to the broadcast spreaders. Because the path width is well defined, gaps and/or overlapping between adjacent paths can result unless the drop spreader is carefully navigated along a path immediately adjacent a previously traversed path. Gaps and overlapping may be undesirable, depending on the material being applied. The low ground clearance of the drop spreader may present difficulties when attempting to traverse terrain with high vegetative ground cover or abrupt changes in ground contour. Drop spreaders are also sometimes hard to propel, particularly when the containment structure is filled to capacity, because the mechanical member that sifts and meters the material through the apertures extends the width of the material.

Broadcast spreaders offer advantages over drop spreaders in some situations. Because they cast the particulate matter outwardly over a path wider than the width of the spreader, broadcast spreaders cover a ground area with the particulate matter of give size more quickly than a drop spreader of comparable size and capacity. Broadcast spreaders typically push relatively easily and because they have only a few large apertures in a rearward central part of the containment structure, these apertures usually remain relatively free of clogs.

Broadcast spreaders spread material with a non-uniform distribution pattern, however. More specifically, typically the central portion of the pattern has a relatively high particle density and the parallel transverse edges (transverse to the direction of travel of the spreader) have a relatively low particle density. This characteristic of the broadcast spreader can be an advantage or a disadvantage, depending on the type of material being spread and the objectives of the spreader user.

If a typical fertilizer is being spread on a lawn or rock salt is being applied to an icy driveway, for example, the uniformity of particle density is not critical and a broadcast spreader is well suited to the task. The lower particle density on the transverse edges can be an advantage in these applications because it is often desirable to have a degree of coverage overlap between adjacent paths to prevent gaps in coverage and the relatively low peripheral density allows a degree of overlap while preventing over application of the material in the overlapping area. Non-uniform transverse particle density is frequently unwanted when applying pesticides or herbicides, however, for reasons cited above, hence the drop spreader is preferred in these applications, despite the aforementioned disadvantages of the same.

A material spreader disclosed in U.S. Pat. No. 4,032,074 to Amerine provides a rotary broadcast type spreader that includes deflection means for deflecting the broadcast material downwardly to form a uniform pattern of controlled configuration. The preferred deflection means is in the form of a shroud the horizontal cross-section of which is in the shape of an ellipse. An impeller on the material spreader sends the material outwardly 360 degrees into contact with the interior of the shroud which deflects the material onto the ground in a uniform pattern. Because the shroud is present, asymmetrical discharge of the particulate matter onto the impeller is not required or provided by the material spreader because the shroud blocks particulate matter from hitting a user walking behind the material spreader. The '074 material spreader is not constructed to be reconfigured to function as a conventional broadcast type spreader and therefore has limited utility. A need exists for a material spreader that is convertible between broadcast and drop modes and so provides the advantages of both types of spreaders and eliminates the disadvantages of each.

BRIEF SUMMARY OF THE INVENTION

An object of the present invention is to fulfill the need expressed above. The dual mode spreader of the present invention is easily convertible between a broadcast mode and a drop mode and so provides the advantages of both devices while eliminating many of the disadvantages of each. In accordance with the principles of the present invention, this objective is obtained by providing a dual mode spreader comprising a container having structure to hold a supply of spreadable material, ground-engaging wheels connected to the container to enable the wheels when rolled along the ground to carry the container over a ground area which is to receive the spreadable material and a handle having structure constructed and arranged with respect to the container to enable a user gripping the handle to manually effect a movement of the container over a ground area by rolling the wheels along the ground.

A spreader disk is mounted in a position below the container for rotational movement about an upright axis in response to the rolling of the wheels when the container is moved. Discharge openings in the container leading to the spreader disk enabling the spreadable material in the container to move therethrough onto the spreader disk to be distributed in a path outwardly thereof during the rotational movement of the spreader disk. An elliptical skirt on the spreader is constructed and arranged to be moved generally vertically with respect to the container and the spreader disk between (1) a broadcast position disposed above the path of distribution of the spreadable material by the spreader disk enabling the spreadable material to be broadcast onto a ground area and (2) a drop position disposed within the path of distribution of the spreadable material by the spreader disk to deflect the spreadable material to move downwardly onto a ground area from the periphery thereof.

A mode determining member on the spreader is constructed and arranged to be moved with respect to the container in coordinated relation with the movement of the elliptical skirt between (1) a broadcast mode wherein the mode determining member cooperates with the discharge openings so as to cause the path of distribution of the spreadable material to extend outwardly of the spreader disk through an arc less than 360° which is devoid of an extent directly to the rear to thereby avoid distributing spreadable material on a user walking behind the container and (2) a drop mode wherein the mode determining member cooperates with the discharge openings so as to cause the path of distribution of the spreadable material to extend outwardly of the spreader disk 360° to enable the spreadable material to move downwardly from the entire periphery of the skirt to form a uniform particle pattern on the ground, An opening control assembly on the spreader is constructed and arranged with respect to the container to control the size of the discharge openings between fully closed and fully opened conditions when the mode determining member is in either mode thereof.

It is understood that in accordance with the principles of the invention, the particular opening control assembly described and illustrated herein is exemplary only and is not limited to use in a dual mode spreader. It is within the scope of the present invention to use the opening control assembly in exclusively drop mode spreaders and exclusively broadcast mode spreaders as well.

Accordingly, it is another objective of the invention to provide an opening control assembly that includes an opening control member spring biased to move into a fully closed position with respect to the discharge openings. The opening control member is constructed and arranged to be moved from the fully closed position against the spring bias thereon toward the fully opened position with respect to the discharge openings.

The opening control assembly further includes a control arm constructed and arranged to enable a user to manually move the control arm from a starting position into an operative holding position; an elongated flexible element connected between the control member and the control arm so that the spring bias of the control member biases the control arm away from the operative holding position; and an adjusting structure constructed and arranged to be moved manually into a plurality of selected positions to cause the elongated element to follow a plurality of paths of different lengths between the control member and the control arm corresponding to the selected position into which the adjusting structure is manually moved.

The length of the path of movement of the flexible element determines the starting position of the control arm when the control member is in the fully closed position thereof. The distance between the starting position and the operative holding position of the control arm determines the amount of movement the control member is moved away from the fully closed position thereof by the elongated flexible element in response to the movement of the control arm from the starting position thereof into the operative holding position thereof to thereby determine the operative size of the discharge openings.

Another objective of the present invention is to provide a spreader having further improvements in the opening control assembly. More specifically, the adjusting structure includes indicia cooperating therewith for indicating an opening size condition corresponding to each selected position thereof. The indicia includes a plurality of individually movable elements distinguishable with respect to one another and sufficient to indicate to the user a plurality of different applications of spreadable material to be made in one season and structure configured to selectively mount the individually movable elements in opening size indicating relation with the indicia.

From a shipping, handling, inventory and marketing standpoint, as distinguished from the operating characteristics of the dual mode spreader, it is desirable to minimize if not eliminate the necessity for the ultimate user of the dual mode spreader to assemble the components thereof. Conversely, it is desirable that the substantially assembled units be easily transported and stored using minimal storage volume.

Accordingly, it is another objective of the present invention to provide a spreader including, in the alternative, a dual mode spreader, a drop mode spreader or a broadcast mode spreader that maximizes and facilitates convenient transportation, handling and storage of the same by providing a container preferably made of a molded plastic material that includes plastic handle connecting structure integrally formed thereon and wherein the handle includes integral plastic container connecting structure thereon disposed in cooperating relation to the plastic handle connecting structure; and wherein the spreader further includes releasably lockable handle pivot providing structure between the connecting structures constructed and arranged to enable the handle to be moved between operative and storage positions. The handle connecting structure, container connecting structure and the pivot providing structure are preferably provided by a connection assembly between the container and the handle.

More specifically, preferably the handle is plastic and is generally U-shaped to form two side members each having a free end defining a pivoting structure. The plastic handle connecting structure comprises pairs of integrally molded spaced elements, each pair of elements receiving therebetween a pivoting structure. The releasably lockable handle pivot providing structure includes a bolt assembly engaged with each pair of elements and with the pivoting structure therebetween. The bolt assemblies are constructed and arranged to interconnect the handle with the container for relative pivotal movement about a common axis provided by the bolt assemblies. Each bolt assembly is movable with respect to the container and the handle between a tightened locking position wherein the associated pair of elements and the pivoting structure therebetween are positively prevented from being moved pivotally with respect to one another about the common axis and a loosened pivoting portion wherein the handle and the container are capable of being moved pivotally with respect to one another about the common axis.

One element of each pair of elements and the associated pivoting structure include communicating interior peripheral surfaces of non-circular configuration. Each bolt assembly includes a blocking structure that has exterior peripheral surfaces complimentary to the associated interior peripheral surfaces and that is movable axially (1) into engagement with both of the associated interior peripheral surfaces when a bolt assembly is moved into the locking position thereof to positively prevent pivotal movement between the handle and container by virtue of the intersurface blocking relationship thereof and (2) out of engagement with the interior peripheral surface of the pivoting structure when the bolt assembly is moved into the loosened pivoting position thereof to enable the handle and container to be pivotally moved with respect to one another about the common axis.

Each bolt assembly includes a threaded shank and a nut threaded thereon so as to be tightened thereon during the movement of the bolt assembly into the tightened locking position thereof. Each bolt assembly includes a first stop surface fixed with respect to the shank thereof and a second stop surface movable with respect to the shank thereof into engagement with the first stop surface thereof by the threaded movement of the nut thereof when a bolt assembly is moved into the tightened locking position thereof to limit the squeezing action of the elements on the pivoting structure therebetween.

Although it is preferred to prevent the pivotal movement of the handle with respect to the container when the handle is locked in its operative position by the mechanical blocking arrangement, it is within the scope of the invention to provide any desired amount of pinching between the elements and the pivoting structure to reinforce the locking provided by the mechanical blocking arrangement. Furthermore, it is within the scope of the invention to eliminate the mechanical blocking entirely from a connection assembly and to provide locking between the molded plastic elements and the pivoting structure therebetween by the pinching action between the elements and the pivoting structure.

It can be appreciated that the connection assembly provides a pivotal connection between two molded plastic structures. In the exemplary embodiment of the present invention, the two molded structures are the container and the handle. It is within the scope of the present invention, however, to use the connection assembly to pivotally connect portions of many types of molded plastic structures including molded plastic lawn furniture, molded plastic toys and recreational equipment and molded plastic lawn and garden equipment. The connection assembly could be modified, for example, to adjustably pivotally mount a molded plastic handle on various types of carts and wagons that can be used while gardening or doing yard work.

Therefore, it is within the scope of the present invention to provide a connection assembly to pivotally connect a first part of a molded plastic structure with a second part of the molded plastic structure. The first part of the structure would be provided with a support structure in the form of a pair of spaced elements such as the elements on the container of the present invention and the second part of the structure would be provided with an integrally molded pivoting structure such as the pivoting structure formed on the handle of the present invention. The support structure is represented by the pair of elements integrally molded on the container.

DETAILED DESCRIPTION OF THE PREFERRED EMBODIMENT AND BEST MODE OF THE INVENTION

Figure 1:
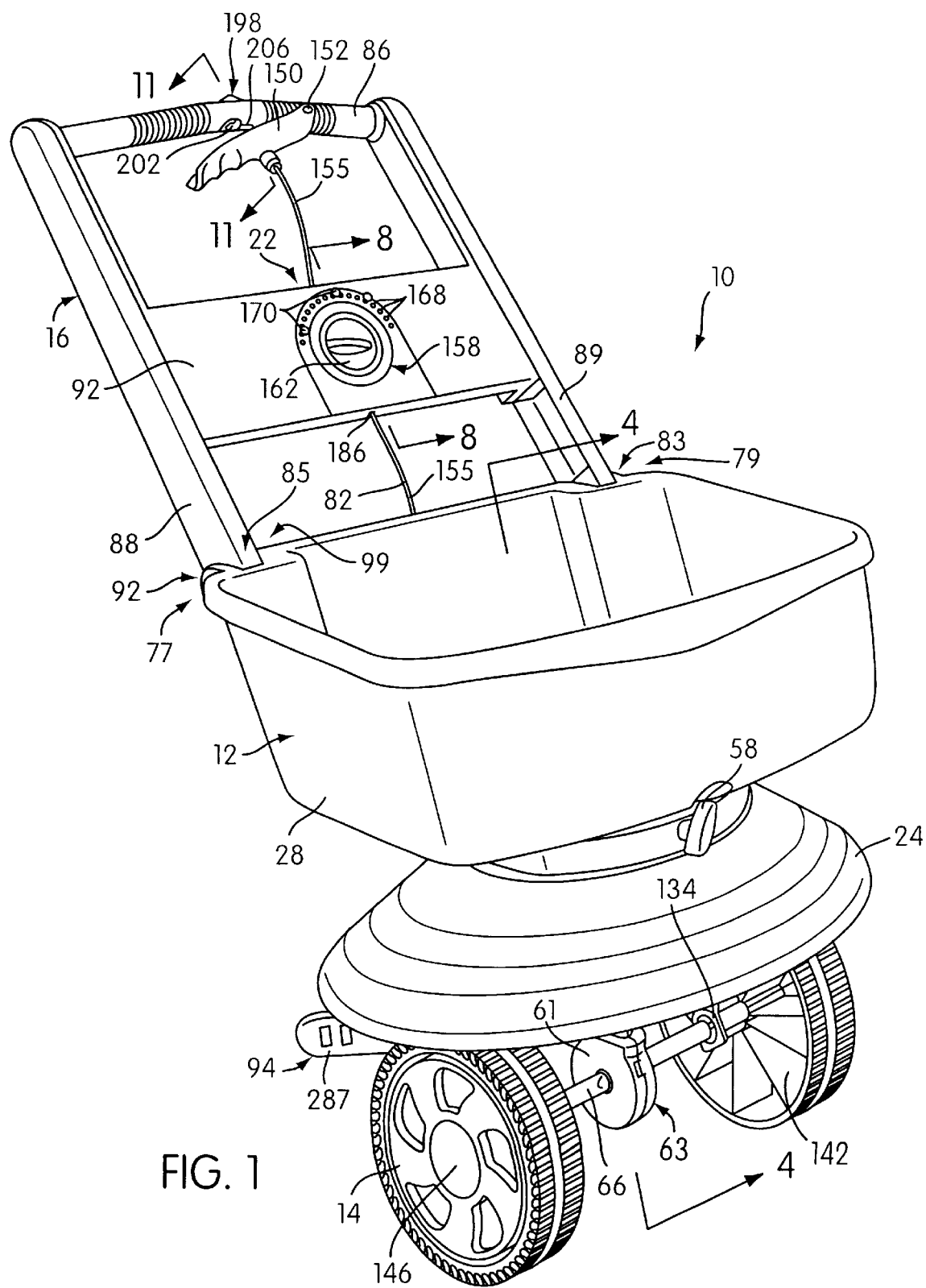
FIG. 1 is a perspective view of a dual mode spreader embodying the principles of the present invention showing the same in a broadcast mode.
Figure 2:
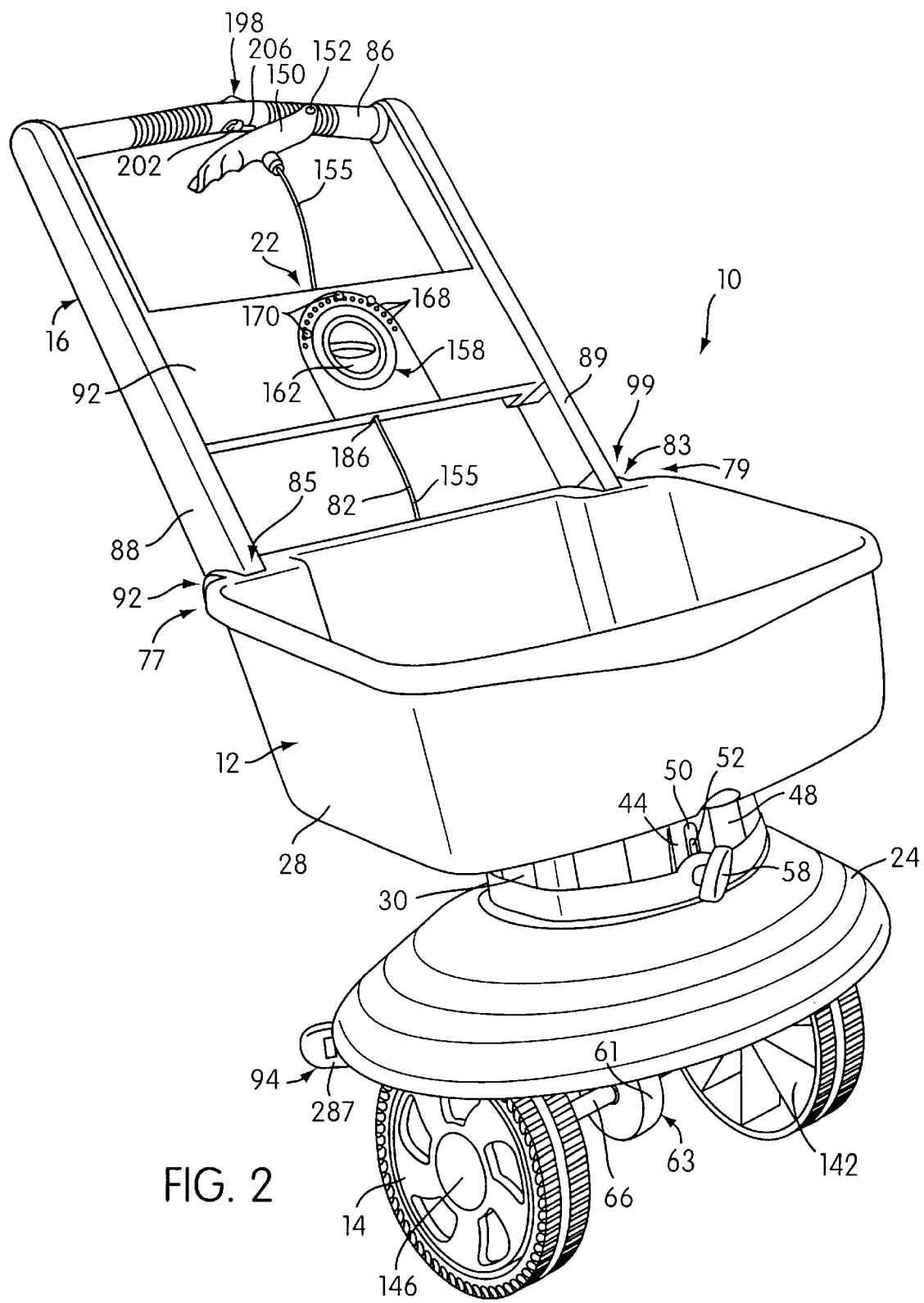
FIG. 2 is a figure similar to FIG. 1 shown the dual mode spreader in a drop mode.
Figure 3:
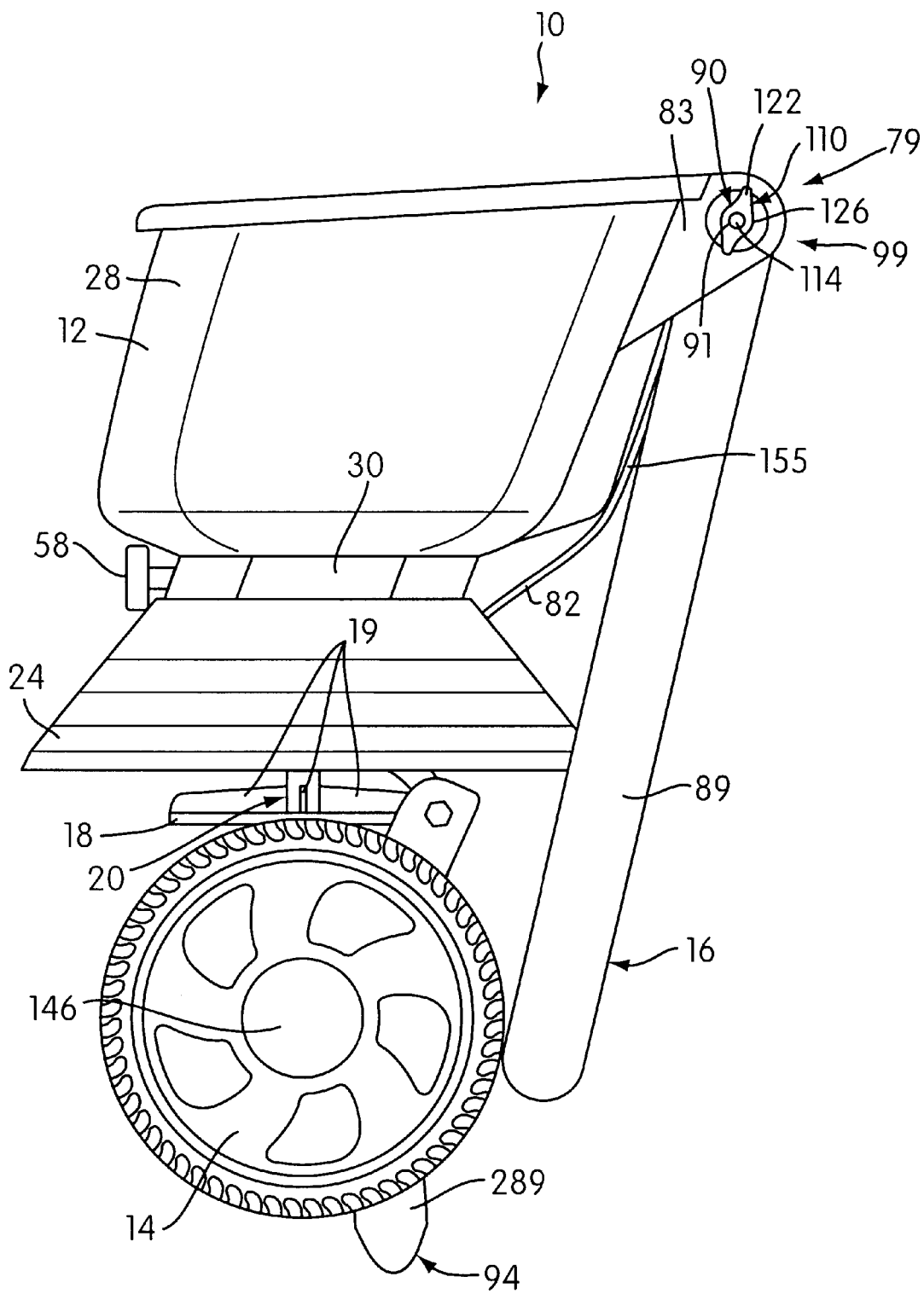
FIG. 3 is a side elevation view of the dual mode spreader in a storage or transportation position.

Referring now to FIGS. 1–3, there is shown the preferred embodiment and best mode of a dual mode spreader, generally designated 10. The spreader 10 includes a container 12 mounted on a pair of ground-engaging wheels 14. The container holds a supply of spreadable particulate material (not shown) and a handle 16 is mounted on and extends upwardly and rearwardly from the container 12 to an operative position to enable a user gripping the handle to manually propel the container 12 over a ground area by rolling the wheels along the ground.

The container 12 is provided with a plurality of discharge openings (not visible in FIGS. 1–3) leading to a spreader disk 18 (not visible in FIGS. 1–2 but shown in FIG. 3). The spreader disk 18 is mounted below the container 12 for rotational movement about an upright axis, generally designated 20, for rotational movement in response to the rotation of the wheels 14 as the container 12 moves. The spreader disk 18 is preferably made of a molded plastic and has a plurality of upwardly extending blades 19 integrally formed thereon preferably 90 degrees apart. As will become apparent, the spreader disk 18 can be any appropriate rotary member that is constructed and arranged to rotate in coordinated relation with the rolling of the wheels and in cooperating relation with the discharge openings to distribute onto the ground the spreadable material that passes through the discharge openings.

An opening control assembly, generally designated 22, controls the effective size of the discharge openings by regulating the amount the openings are covered between fully closed and fully opened conditions to start, stop and meter the flow of material from the container 12 onto the spreader disk 18. As will become apparent, the opening control assembly 22 performs this function in both the broadcast mode and the drop mode of the dual mode spreader.

An elliptical skirt 24 is mounted about the container 12 and is constructed and arranged to be moved generally vertically with respect to the container 12 and the spreader disk 18 between (1) a broadcast position (shown, for example, in FIGS. 1 and 3) disposed above the distribution path of the spreadable material by the spreader disk enabling the material to be broadcast onto a ground area and (2) a drop position (shown, for example, in FIG. 2) disposed within the path of distribution of the spreadable material by the spreader disk to deflect the same to move downwardly onto a ground area from the periphery of the skirt 24 to form a uniform particle pattern on the ground.

A mode determining member (interconnected with the elliptical skirt 24 in a manner described below) is constructed and arranged to be moved with respect to the container 12 in coordinated relation with the movement of the elliptical skirt 24 between the broadcast mode and the drop mode to control the pattern of flow of material through the discharge openings to the spreader disk 18. The mode determining member, generally designated 26, is shown, for example, in the cross-sectional view of FIG. 4 showing the dual mode spreader 10 in the broadcast mode.

Figure 4:
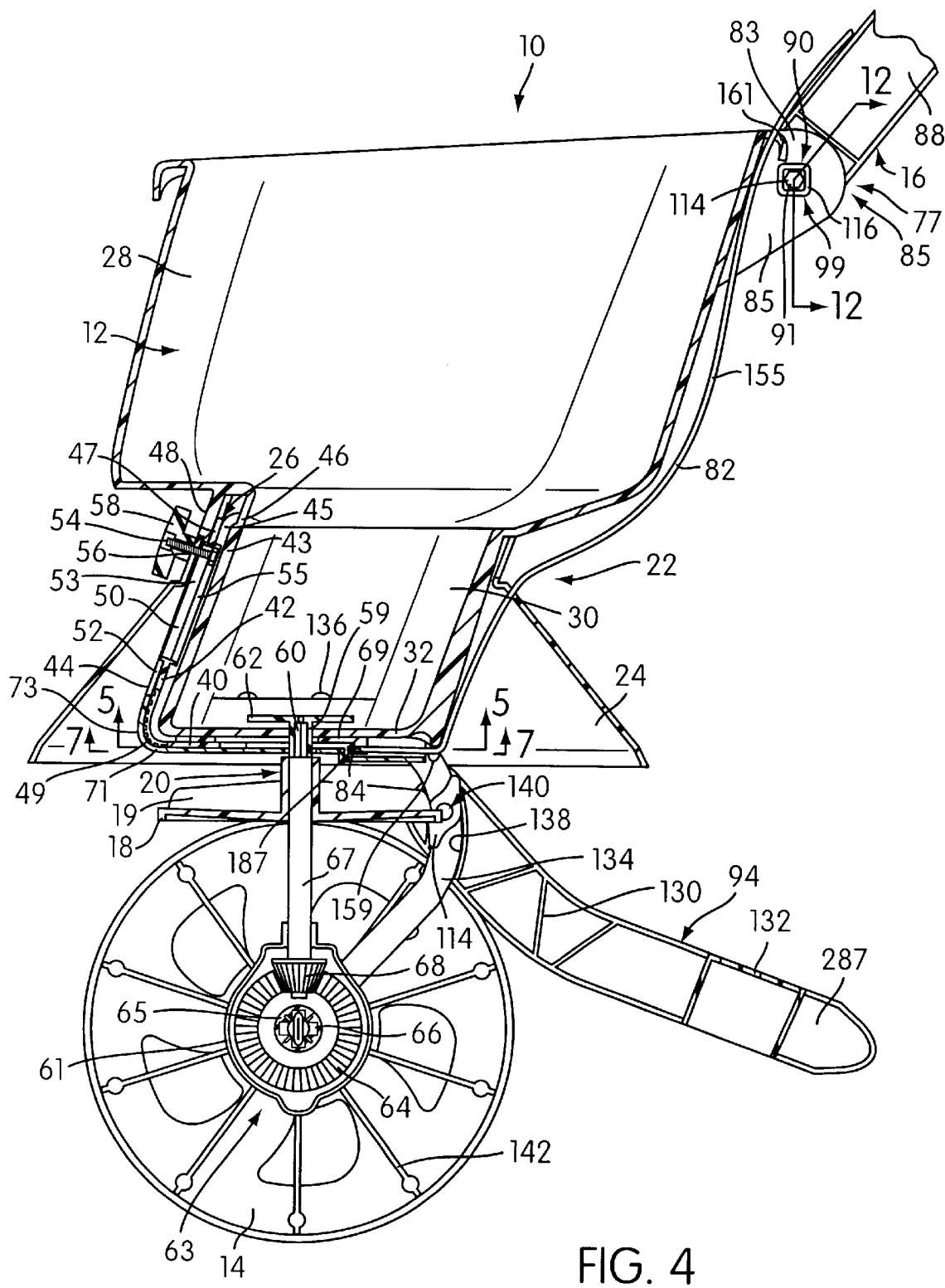
FIG. 4 is an enlarged fragmentary sectional view taken along the line 4—4 of FIG. 1.
Figure 5:
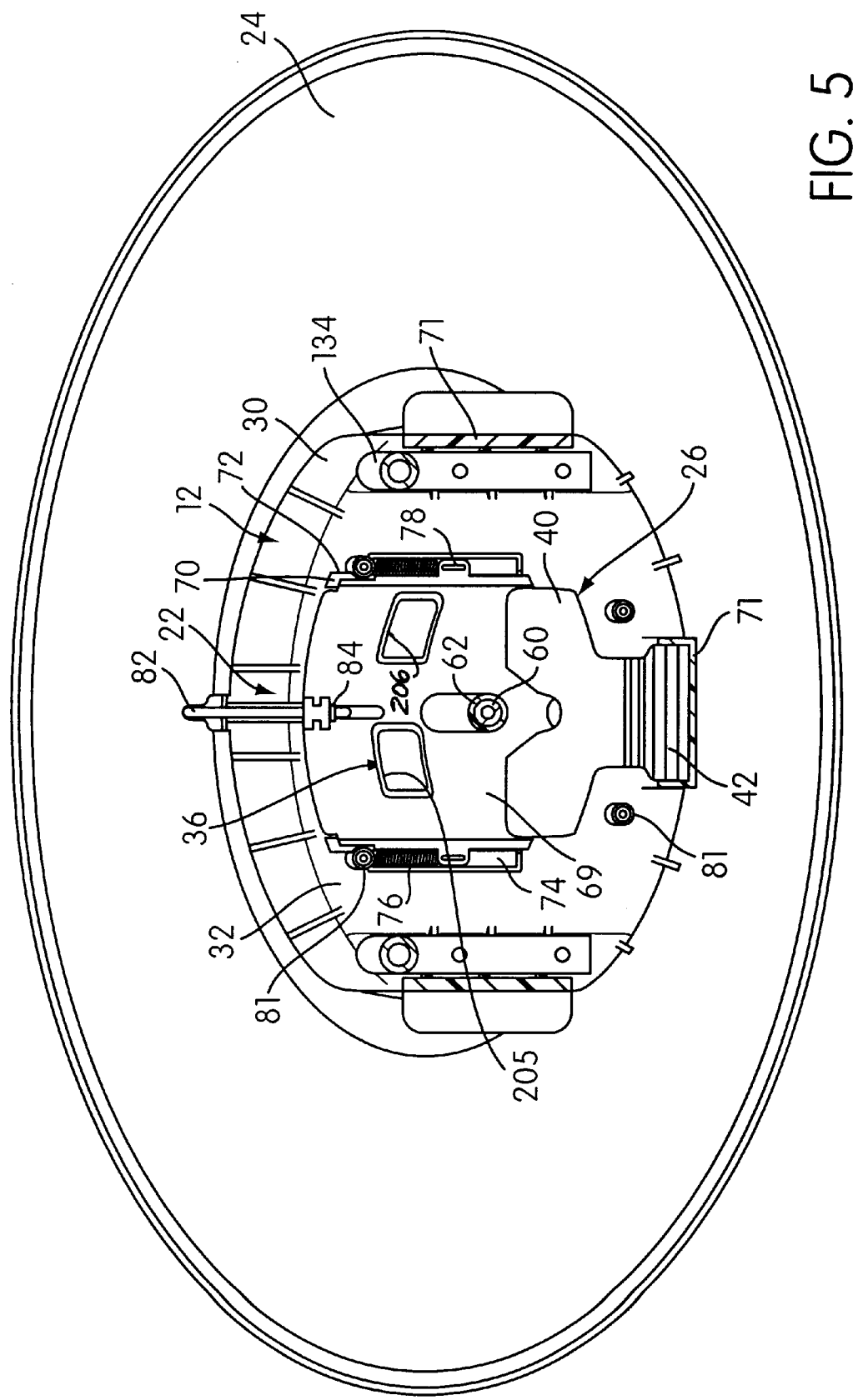
FIG. 5 is a fragmentary sectional view taken along the line 5—5 of FIG. 4 showing the components in a broadcast mode.

FIG. 4 shows that the container 12 has a large upper portion 28 and small lower portion 30 so that particulate matter in the container 12 is directed toward the discharge openings located forwardly and rearwardly of the upright axis 20 in the central portion of the bottom 32 of the container 12. The discharge openings, generally designated 38, are not visible in FIG. 4, but can be seen in FIGS. 5–6. FIG. 5 shows a cross-sectional view of a bottom portion of the spreader 10 taken along the line 5—5 in FIG. 4 and FIG. 6 shows a similar view as FIG. 5 taken through the same line, but showing the configuration of the spreader 10 when the elliptical skirt 24 and the mode determining member are in the drop mode.

Figure 6:
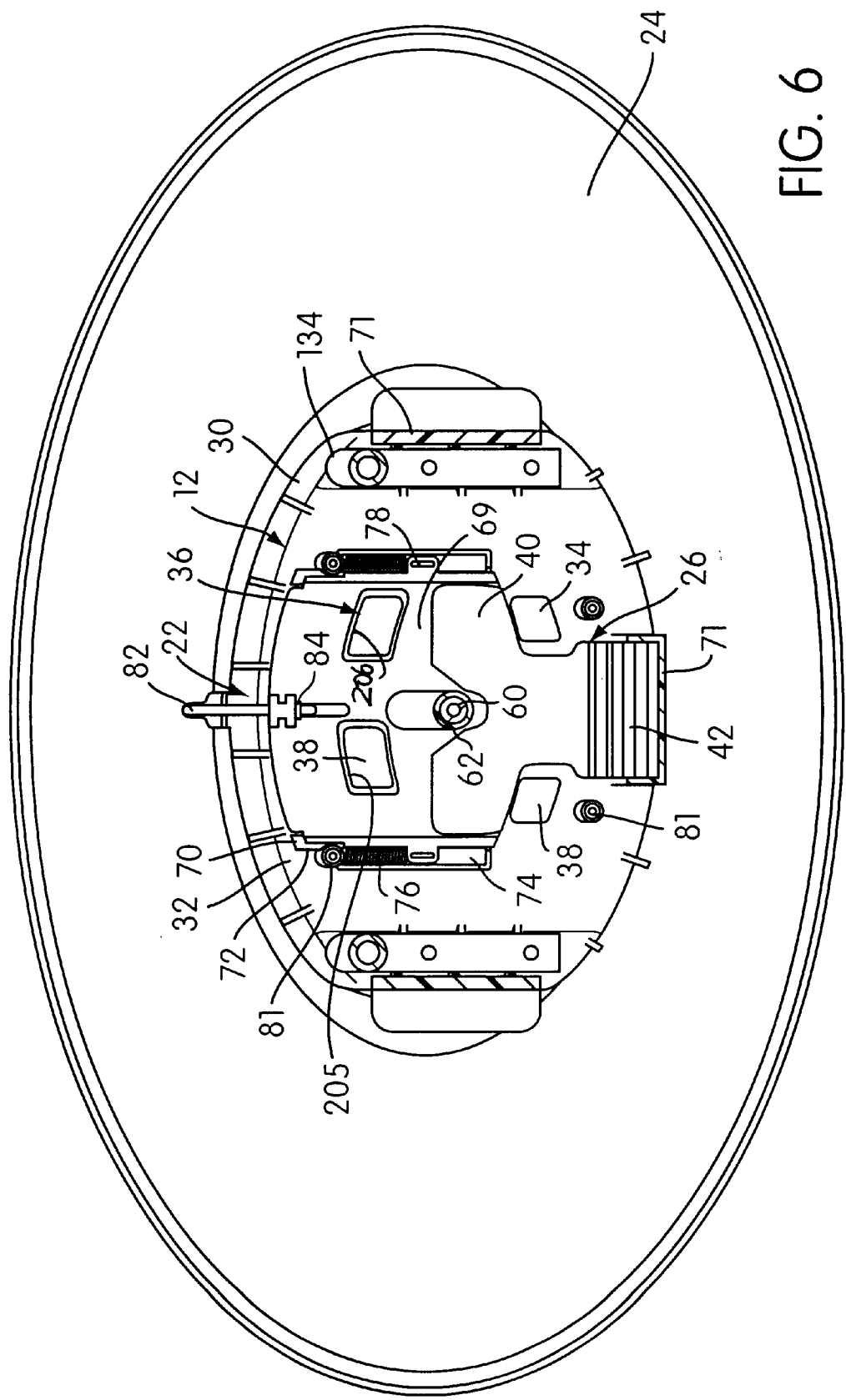
FIG. 6 is a view similar to FIG. 5 showing the components in a drop mode.

FIG. 5 shows a rearward pair 36 of discharge openings 38 formed in the bottom 32 of the container 12 and FIG. 6 shows a forward pair 34 of discharge openings 38 also formed in the container 12. The forward and rearward pairs 34, 36 of openings are disposed around the axis of rotation 20 of the spreader disk 18 with the forward pair 34 being disposed forwardly thereof and the rearward pair 36 being disposed rearwardly thereof. Each opening of the rearward pair 36 of openings 38 is approximately the same width as each opening of the forward pair 34 of openings.

When the elliptical skirt 24 is moved to the broadcast mode position (shown, for example, in FIGS. 3–5), the mode determining member 26 moves with the elliptical skirt 24 so that when the elliptical skirt 24 reaches the upward extent of its movement, the mode determining member 26 moves therewith into covering relation with the forward pair 34 of discharge openings 38. This is the broadcast mode or position of the mode determining member. This relation between the mode determining member 26 and the openings 34 of openings is shown in FIG. 5.

It can be appreciated that in the broadcast mode, the mode determining member 26 cooperates with the discharge openings 38 to direct the material to a rearward portion of the rotating disk 18 by blocking or covering the front pair of openings. This causes the material to be broadcast outwardly from the spreader disk 18 through an arc less than 360° which is devoid of an extent directly to the rear. This prevents the material from being thrown on the user walking behind the container 12.

When the elliptical skirt 24 is lowered to the drop mode, the mode determining member 26 moves therewith (in a manner described below) so that when the elliptical skirt 24 reaches its lowest extent, the mode determining member 26 is in the position shown in FIG. 6. This is the drop mode position of the mode determining member. In this position, the mode determining member 26 is in uncovering relation with the forward pair 34 of openings 38.

Thus, it can be appreciated that in the drop mode, the material that is propelled outwardly by the rotating spreader disk 18 hits the sides of the interior of the elliptical skirt 24 and then drops or is directed generally downwardly onto the ground beneath the elliptical skirt 24.

It can be appreciated from FIGS. 4–6 that the mode determining member 26 is a sheet-like structure preferably made of a molded plastic having a generally horizontally extending portion 40 and a rollingly bendable portion 42 integrally formed therewith at a generally horizontally disposed end of the horizontally extending portion 40. The rollingly bendable portion 42 includes a rigid sheet-like upper portion 47 and a bendable central portion 49. The rollingly bendable portion 42 of the mode determining member 26 is connected at a generally vertically disposed end thereof with the elliptical skirt 24 in a manner best seen in FIG. 4.

The rollingly bendable portion 42 of the mode determining member 26 is slidably disposed between forward and rearward wall portions 44, 46, respectively, integrally formed on the front side 48 of the container 12. The length of the rollingly bendable portion 42 is supported and guided by a plurality of fin-like support structures 43, 45 integrally formed on the front of the container 12. The forward wall portion 44 of the container 12 and the rollingly bendable portion 42 have aligned, vertically extending slots 50, 52, respectively. A bolt member 54 extends through the slots 50, 52 and through an aperture 56 in the elliptical skirt 24 and threadedly engages an adjustment handle 58. The slot 52 on the mode determining member is surrounded on each side by inner and outer integral wall portions 53, 55. The inner wall portion 53 surrounds the head of the bolt to prevent rotation of the same when the handle is rotated. The outer wall portion 55 slides within slot 50 to help guide the sliding movement of the mode determining member with respect to the container 12.

The adjustment handle 58 is tightened to hold the elliptical skirt 24 and the mode determining member 26 in either their broadcast mode or the drop mode operating positions. When the adjustment handle 58 (shown holding the elliptical skirt 24 and mode determining member 26 in the broadcast mode in FIG. 4) is loosened, the elliptical skirt 24 can be moved downwardly, moving the bolt 54 downwardly therewith in slots 50, 52. When the bolt 54 moves downwardly to the bottom of slot 52, continued downward movement of the elliptical skirt 24 moves the mode determining member 26 from its broadcast mode position shown in FIG. 5 to its drop mode position shown in FIG. 6. The handle 58 is retightened to hold the elliptical skirt 24 and mode determining member 26 in the drop mode position. In a similar manner, the elliptical skirt 24 can be raised to move the elliptical skirt and the mode determining member 26 together back to their broadcast modes and can be held there by retightening the handle 58.

The spreader disk 18 is mounted on a shaft 60 (which defines the rotational axis 20 of the disk 18) preferably made of tubular hard molded plastic or other material of suitable strength. The shaft 60 extends through the bottom 32 of the container 12. An opening clearing member 62 is secured to the shaft 60 in a position above the discharge openings 38 to move in clod clearing relation with the discharge openings 38 when the shaft is rotated. Preferably the clearing member 62 is plastic and is fixed to the shaft 60 by a screw or by any other suitable means. The tip of the shaft 60 has a hexagonal exterior 59 that a shaped to receive a complimentarily-shaped portion of the clearing member 62.

The shaft 60, the spreader disk 18 secured to the shaft 60 and the clearing member 62 secured to the shaft 60 are rotated as a unit by a gear assembly 63 that transmits power thereto from the manual rotational movement of the wheels 14 when the spreader 10 is pushed. More specifically, a bevel gear 64 rigidly mounted on an axle 66 that extends between the wheels 14 is interengaged with a second bevel gear 68 rigidly mounted on the shaft 60 so that rotation of the wheels 14 rotates the shaft, spreader disk 18 and clearing member 62. As best seen in FIG. 4, the bevel gear 68 has a long integral plastic sleeve 67 integrally formed with the shaft 60. The gears 64, 68 are preferably made of a hard, molded plastic, but any suitable material can be used and are enclosed in a housing 61 preferably made of a suitable plastic.

As best seen in the cross-section of FIG. 4, a central portion of the axle 66 is flattened and engages a slot 65 in the first bevel gear 64 so that when the wheels 14 rotate, the rotation of the axle 66 drives the gears 64, 68. The axle 66 is preferably made of tubular steel or other material of suitable strength.

The opening control assembly 22 includes a control member 69 of sheet-like configuration, preferably made of a molded plastic or other suitable material. The mode determining member 26 is disposed in abutting relation between the control member 69 and a skeletonized retainer member 71, preferably made of molded plastic, secured to the container 12. As best seen in FIG. 4, the control member 69 is slidably disposed against the bottom of the container 12 and the horizontally extending portion 40 of the mode determining member 26 is slidably disposed between the control member 60 and the retainer member 7 1.

The retainer member 7 1 functions as a cover member to hold the control member 69, the horizontally extending portion 40 of the mode determining member 26 and the structures associated therewith in place on the bottom of the container 12. A forward portion 73 of the retainer member 71 is molded to guide the movement of the rollingly bendable portion of the mode determining member 26 when the same moves between its broadcast mode position and its drop mode position.

Figure 7:
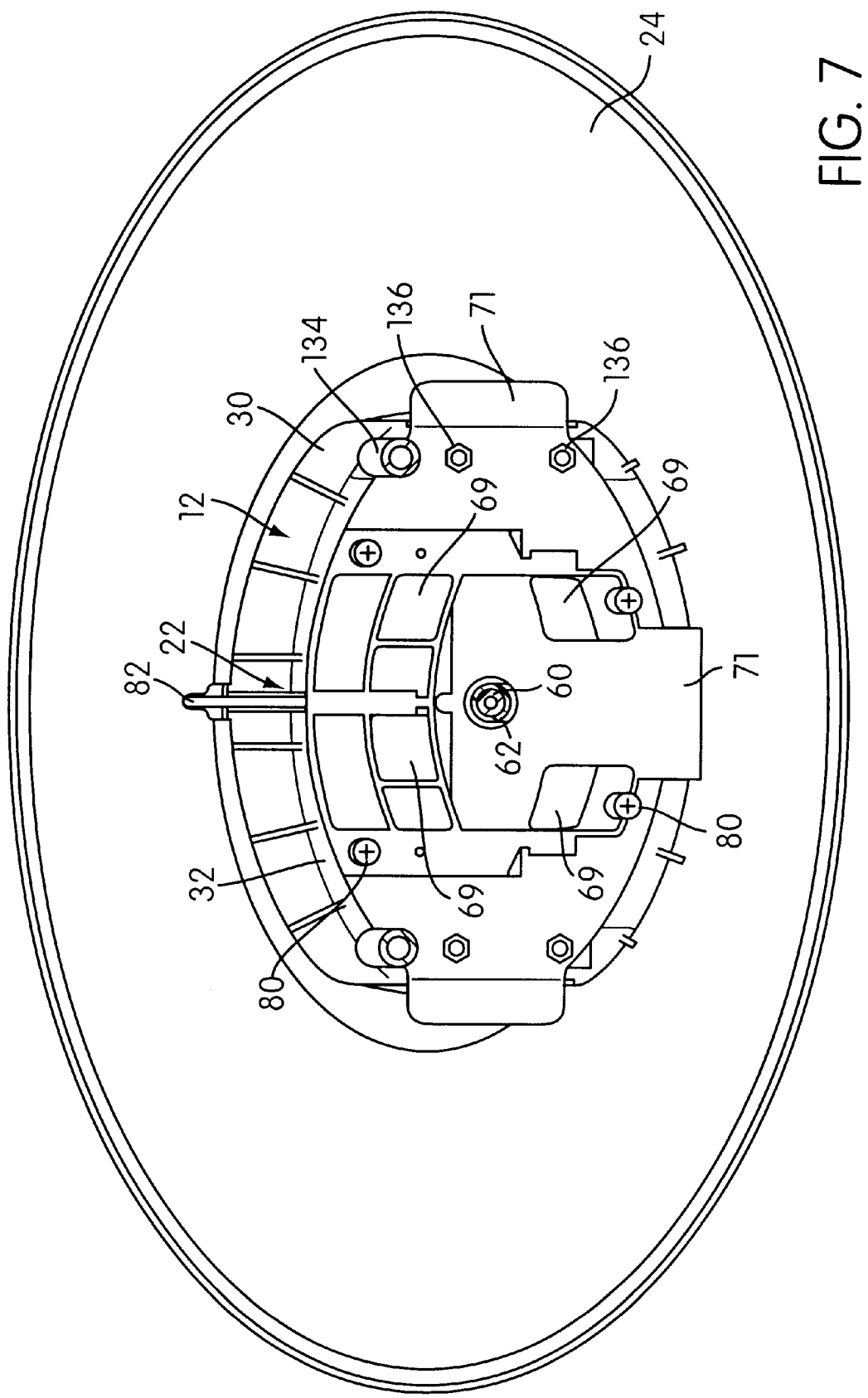
FIG. 7 is a fragmentary sectional view taken along the line 7—7 of FIG. 4.

The sliding movement of the control member 69 controls the flow of material through the discharge openings 38. The control member 69 is movable between a fully closed position (shown in FIG. 7) and a fully open position to start, stop and meter the flow of material from the openings 38 onto the spreader disk 18. More specifically, the control member 69 is spring biased to move into its fully closed position with respect to the discharge openings 38 and is constructed and arranged to be moved against the spring bias from the fully closed position toward a fully opened position with respect to the discharge openings 38. The fully open position of the control member 69 is shown in FIGS. 5–6.

It can be appreciated from FIGS. 5–6 that the movement of the control member 69 is limited and guided by rearward and lateral wall portions 70, 72, respectively, integrally formed on the bottom 32 of the container 12 to guide the forward and rearward sliding movement of the control member 69. The lateral wall portions 72 form longitudinally extending spring enclosures 74 that contain coil springs 76. The sheet-like control member 69 slidingly engages the bottom 32 of the container with a central portion 67 thereof and slidingly engages the walls 72 of the spring enclosures 74 with extensions or wing-like members 78 formed on lateral edges of the control member 69. Integral downwardly extending flanges (not visible) molded on the extensions 78 extend into the enclosures 74 to help guide the movement of the control 69 member and to biasingly engage the springs 76 which bias the control member 69 forwardly to the closed position thereof. The control member 69 is shown fully rearward and the springs 76 compressed in FIGS. 5–6 to shown the discharge openings 38.

The retainer member 71 is secured to the bottom 32 of the container 12 by conventional screws 80 that extend through blind bores 81 in the container 12. The retainer member 71 holds the springs 76 in the enclosures 74, the control member 69 in sliding engagement with the bottom of the container and with the top edges of the walls 72 and the flanges on the extensions 78 in biasing engagement with the springs 76.

An elongated flexible element 82 which forms part of the opening control assembly 22 is secured by a crimped collar member 84 that is secured to the end of the elongated flexible member 82. The collar member 84 holds the flexible element in a slot 187 integrally formed within the control member 69. As will become apparent, the flexible element 82 is used to control opening and closing of the control member 69 to start, stop and meter the flow of material during operation of the spreader 10. Before this is considered in detail, however, the structure of the handle 16 will be further considered.

The molded plastic handle 16 is pivotally mounted to the container 12 by connection assemblies, generally designated 77 and 79. The handle 16 is generally U-shaped and includes a handle member 86 and two side members 88, 89 secured thereto. A molded plastic cross member 92 extends between intermediate portions of the side members 88, 89. The plastic container 12 includes plastic handle connecting structure 83 integrally molded thereon and the handle 16 includes integral plastic container connecting structure 85 integrally molded thereon and disposed in cooperating relation to the plastic handle connecting structure 83 to pivotally mount the handle 16 to the container. Releasably lockable handle pivot providing structure 90 is interengaged with the connecting structures 83, 85 to enable the handle 16 to be selectively moved between operative and storage positions. The embodiment of the releasably lockable handle pivot providing structure 90 illustrated in the drawings is a bolt assembly, generally designated 91. Each connection assembly 77, 79 includes connecting structures 83, 85 and a pivot providing structure 90.

The connecting structures 83, 85 generally comprise cooperating pairs of interengaging structures, generally designated 99, on the container and the free end of each side member 88, 89 of handle 16. A bolt assembly 91 extends through each cooperating pair of interengaging structures interconnecting the handle 16 and container 12 to pivotally mount handle 16 on the container 12.

Figure 12:
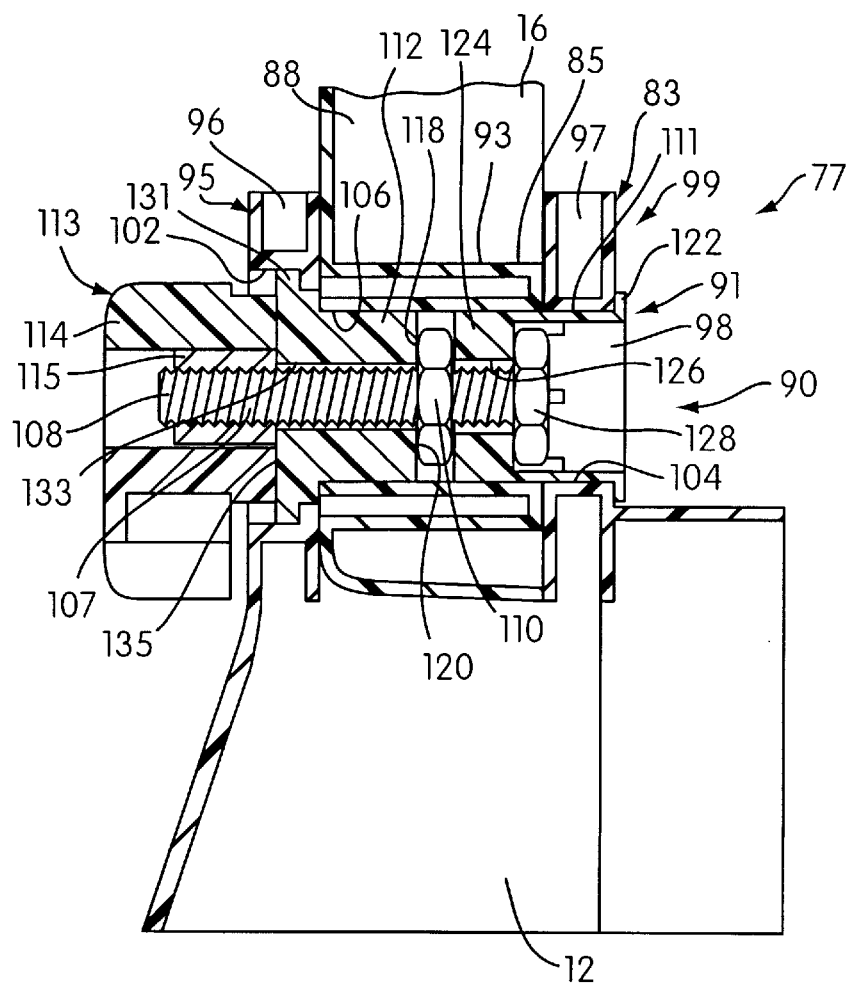
FIG. 12 is an enlarged fragmentary sectional view taken along the line 12—12 of FIG. 4.

The construction of the connection assembly 77 is best seen in the cross-sectional view of FIG. 12 which shows the pivotal mounting of the handle through the line 12—12 of FIG. 4. It can be appreciated that the connection assemblies 77, 79 on each side of the container 12 are mirror images of one another. Only one connection assembly 77 will be discussed, but one skilled in the art will understand that the discussion also applies to the assembly 79 on the opposite side as well.

As best seen in FIG. 12, the plastic container connecting structure 85 on the free end of the side member 88 of the handle 16 defines pivoting structure 93 integrally on the handle 16 and the plastic handle connecting structure 83 on the container 12 includes a pair of integrally molded spaced elements, generally designated 95, that include first and second elements 96 and 97, respectively. The pair of elements 95 receives therebetween the pivoting structure 93 of the handle 16.

As shown in FIG. 12, an aperture 102 extends through the first element 96, an aperture 104 extends through the second element 97 and an aperture 106 extends through the pivoting structure 93 of the free end of the side member 88 of the handle 16. The bolt assembly 91 is received within the aligned apertures 102, 104, 106 to pivotally mount the handle 16 to the container 12.

The interior walls of aperture 104 in the second element 97 and the interior walls of an end portion of the aperture 106 in the pivoting structure 93 of the side member 88 each define identical polygonal cross-sections taken through a plane perpendicular to the central axis of each aperture 104, 106 (which central axis essentially coincides with the central axis of a shank portion 107 of a conventional bolt 108 that forms part of the bolt assembly 91 extending therethrough as shown in FIG. 12). In the preferred embodiment, the preferred polygon of the cross-sections is a square although other polygonal cross-sections are within the scope of the invention.

The bolt assembly 91 includes a molded plastic head structure or blocking structure 98 mounted on the bolt 108 by a conventional nut 110. An exterior surface portion 111 of the head structure 98 defines a polygonal cross-sectional configuration which is complimentary to and can be press fit into the interior cross-sectional polygonal configurations defined by the apertures 104, 106 when the apertures 104, 106 are properly aligned by pivoting the handle 16. Preferably, therefore, the exterior surface portion 111 of the head structure 98 has a square cross-section that is complimentary to the square cross-section of the apertures 104, 106.

A stop member 112, preferably made of molded plastic, extends through aperture 102 of the first element 96 and partially into aperture 106 of the pivoting structure 93. The pivoting structure 93 of the handle 16 is molded such that the end portion of the aperture 106 that receives the stop member 112 is cylindrical (i.e., has a cylindrical cross-section when the cross-section is taken through a plane perpendicular to the central axis of the aperture 106) to allow the handle 16 to move with respect to the member 112 when the handle 16 is repositioned and is molded such that the portion of the aperture 106 that receives the head structure 98 of the bolt assembly 91 is of polygonal cross-section as described above.

The stop member II 2 is sized to frictionally engage each aperture 102, 106 a slight amount to enable the member 112 to be press fit into the axially aligned apertures 102 106 to assure a snug fit between the handle 16 and container. The bolt assembly 91 is releasably held in engagement with the connection assembly 77 by a wing nut structure 113. The nut structure 113 has a manually engageable molded plastic wing portion 114 that is molded around an internally threaded metal sleeve member 115 threadedly mounted on the shank portion 107 of the bolt 108. The stop member 112 supports one end of the bolt assembly 110 when the handle 16 is in its operative position and the member 1 12 cooperates with the nut 110 in a manner described below to limit the amount that the bolt assembly 91 can be tightened when the handle 16 is locked in the operative position.

The operation of the connection assembly 77 can be understood with reference to FIG. 12. The operation of connection assembly 79 is identical and can be understood from the discussion of the operation of assembly 77 so the operation of assembly 79 will not be discussed in detail. The connection assembly 77 releasably locks the handle 16 to the container 12 so that the handle 16 can be moved with respect to the container between (1) an operative position extending upwardly and rearwardly from the container and (2) a storage position extending downwardly in generally coextensive relation with the container when the handle 16 is in its storage position.

It can be appreciated from FIG. 12 that the adjacent apertures 104, 106 cooperate to provide the connection assembly 77 with adjacent intercommunicating portions of polygonal interior cross-sectional configuration and that the head structure 98 of each bolt assembly 91 provides the assembly 77 with a portion of corresponding polygonal exterior cross-sectional configuration that cooperates with the apertures 104, 106 to allow the handle 16 to be locked in its operative position and to be moved between the operative and storage positions with respect to the container 12.

As will become apparent, the head structure or blocking structure 98 of the bolt assembly 91 can be manipulated so that it is disposed (1) within the adjacent intercommunicating portions 104, 106 of the associated cooperating pair of interengaging structure 99 when the bolt assembly 91 is tightened to retain the handle 16 in the operative position thereof with a positive mechanical blocking arrangement between the apertures 104, 106 and the head structure 98 (referred to as the "tightened locking position" of the bolt assembly 91) and (2) within only one of the adjacent intercommunicating portions of the associated cooperating pair of interengaging structures (i.e., aperture 104) when the bolt assembly 91 is loosened to allow the handle 16 to be moved between its operative and storage positions (referred to as the "loosened pivoting position" of the bolt assembly 91.

The bolts 108 of the bolt assemblies 91 of the connection assemblies 77, 79 cooperate to form a common axis (hereinafter referred to as the "common axis") of pivotal movement of the handle with respect to the container. With specific reference to connection assembly 77, when the bolt assembly 91 is in the tightened locking position (shown in FIG. 12) the associated pair of elements 95 and the pivoting structure 93 therebetween are positively prevented from being moved pivotally with respect to one another about the common axis. When the bolt assembly 91 is in the loosened pivoting position (not shown), the handle 16 and container are capable of being moved pivotally with respect to on another about the common axis.

In the broader aspects of the invention it is contemplated to provide one element 96 or 97 of each pair of elements 95 and the associated pivoting structure 93 with communicating interior peripheral surfaces of noncircular configuration. In the exemplary embodiment of the connection assembly 77 shown in FIG. 12, the intercommunicating surfaces are surface 104 and a portion of surface 106 adjacent thereto. The exemplary embodiment also shows that the intercommunicating interior peripheral surfaces are provided on the element 97 and the end of the aperture 106 adjacent thereto, but the connection assembly 77 could be constructed to provide the interior peripheral surfaces of noncircular configuration on the element 96 and on the end of the aperture 106 adjacent thereto.

Also included in the broader aspects of the invention is providing the bolt assembly 91 with blocking structure having exterior peripheral surfaces complimentary to the associated interior peripheral surfaces 104, 106 and movable axially (1) into engagement with both of the associated interior peripheral surfaces 104, 106 when a bolt assembly 91 is moved into the tightened locking position thereof to positively prevent pivotal movement between the handle 16 and container 12 by virtue of the intersurface blocking relationship thereof and (2) out of engagement with the interior peripheral surface 106 of said pivoting structure 93 when the bolt assembly 91 is moved into the loosened pivoting position thereof to enable the handle 16 and container 12 to be pivotally moved with respect to one another about the common axis. In the exemplary embodiment of the connection assembly 77 shown in FIG. 12, the blocking structure is provided by the exterior surface portion 111 of the head structure 98 of the bolt assembly 91.

To unlock and release the handle 16 for pivotal movement with respect to the container 12, the spreader user manually turns the wing nut structure 113 to loosen the same and then pushes on the nut structure 113 in a axial direction with sufficient force to cause the head structure or blocking structure 98 (which is press fit into the apertures 104, 106) to pop or snap out of the aperture 106. The head structure 98 is preferably made of a hard molded plastic to provide this press fit engagement with the molded plastic element 97 and the pivoting structure 93. The manual pushing force typically causes the wing nut structure 113 to impact the stop member 112 as the head structure 98 snaps or pops out of aperture 106 in the pivoting structure 93 of the handle 16.

The wing nut structure 113 must be loosened sufficiently to allow the head structure 98 to completely move out of the aperture 106 before the handle 16 can be pivoted with respect to the container. The stop member 112 remains in place within apertures 102, 106 during pivotal movement of the handle 16. A portion of the head structure 98 remains snugly in the aperture 104 as the handle 16 is pivoted. When the head structure 98 is moved axially out of blocking relation with aperture 106 in the pivoting structure 93, the handle 16 can be pivoted from its operative position shown in FIG. 1 to its storage position shown in FIG. 3. The bolt assembly may be tightened to hold the handle 16 in the storage position. The interior polygonal cross-sectional portions of the apertures 104, 106 can be constructed such that the cross-sections thereof are aligned when the handle 16 is in its storage position so that the handle 16 is held in the storage position by the mechanical blocking action of the head structure 98 in the aligned apertures 104, 106, or, preferably, the polygonal cross-sections of the apertures 104, 106 can be configured such that they are not aligned when the handle 16 is in its storage position so that the handle 16 is held in its storage position when the bolt assembly 91 is tightened by the pinching action of the elements 95 on the pivoting structure 93 of the handle 16.

When the user wants to return the handle 16 to the operative position, the handle 16 is pivoted upwardly. As the side member 88 pivots, the polygonal interior of the aperture 104 and the polygonal interior portion of the aperture 106 are periodically aligned to receive the head structure 98 therein. When the apertures 104, 106 are so aligned, the head structure 98 can be press fit into aperture 106 by retightening the wing nut structure 113.

The connection assembly 77 is provided with structure that prevents the bolt assembly 91 from being overtightened. Overtightening may crush the molded plastic parts of the connection assembly 77, particularly if the user uses a hand tool such as a large adjustable wrench to tighten the wing nut structure 113. More specifically, the nut 110 of the bolt assembly 91 includes a first stop surface 118 that is fixed with respect to the shank 107 of the bolt 108 of the bolt assembly 91 and the stop member 112 of the bolt assembly 91 includes a second stop surface 120 movable with respect to the shank 107 of the bolt 108 of the bolt assembly 91 into engagement with the first stop surface 118 of the bolt assembly 91 by the threaded movement of the wing nut structure 1 13 when a bolt assembly 91 is moved into its tightened locking position. As can be appreciated from FIG. 12, this contact between the stop surfaces 118, 120 limits the squeezing action of the pair of elements 95 on the pivoting structure 93 to prevent damage thereto when a large tightening force is exerted on the wing nut structure 113.

It can also be appreciated from FIG. 12 that the head structure or blocking structure 98 of each bolt assembly 91 can be considered to include a blocking member 124 that prevents the pivotal movement of the handle 16 when the blocking structure is in its tightened locking position and a peripheral flange 122 integrally formed with the blocking member 124. The flange 122 is constructed and arranged to engage the associated element 97 when the exterior peripheral surface 111 of polygonal cross-sectional configuration of the blocking member 124 of the head structure or blocking structure 98 is within the aligned apertures 104, 106 to limit the axially inward movement of the blocking member 124 into the apertures 104, 106 when the bolt assembly is tightened.

The shank 107 of the bolt 108 extends through an axial opening 126 in the blocking member 124. The blocking member 124 is rigidly held on the shank 107 between a conventional head portion 128 of the bolt and a nut or first stop member 110 that is tightened onto the shank. The nut or stop member 110 defines the first stop surface 118 of the bolt assembly. The second stop member 112 defines the second stop surface 120 of the bolt assembly 91 and member 112 has an annular flange 131 that engages a complimentary annular flange 137 integrally formed in the aperture 102 of the adjacent element 96. The second stop member 112 has a central opening 133 through which said shank 107 of the bolt assembly 91 extends and an end surface 135 that is engaged by the wing nut structure 113.

When the bolt assembly 91 is tightened, the peripheral flange 122 and the annular flange 131 cooperate to cause the elements 96, 97 to bias against or pinch the pivoting structure 93. This pinching action is limited by contact between the stop surfaces 118, 120. Therefore, it can be understood that the construction of the bolt assembly 91 can be varied to provide any desired degree of pinching between the elements 96, 97 and the pivoting structure 93. The stop member 112 can be made wide enough in the axial direction, for example, to prevent all pinching action between the elements 95 and the pivoting structure 93 or can be made narrower to provide moderate pinching or narrowed still further to provide a relatively large amount of pinching.

It can also be understood that although it is preferred to prevent the pivotal movement of the handle 16 with respect to the container when the handle 16 is locked in its operative position by the mechanical blocking arrangement described above, it is within the scope of the invention to provide any desired amount of pinching between the elements 95 and the pivoting structure 93 to reinforce the locking provided by the mechanical blocking arrangement. Furthermore, it is within the scope of the invention to eliminate the mechanical blocking entirely from a connection assembly and to provide locking between the molded plastic elements 95 and the pivoting structure 93 therebetween by the pinching action between the elements 95 and the pivoting structure 93.

It can be appreciated that the connection assembly 77 provides a pivotal connection between two molded plastic structures. In the present invention, the two molded structures are the container 12 and the handle 16. It is within the scope of the present invention, however, to use the connection assembly 77 to pivotally connect portions of many types of molded plastic structures including molded plastic lawn furniture, molded plastic toys and recreational equipment and molded plastic lawn and garden equipment. The connection assembly 77 could be modified, for example, to adjustably pivotally mount a molded plastic handle on various types of carts and wagons that can be used while gardening or doing yard work. The polygonal interior surfaces of the pivoting structure and an adjacent element and the complimentary polygonal exterior shape of the head structure of the bolt assembly therefor can be constructed to provide a plurality of operative positions and a storage position or a single operative position and a storage position.

Therefore, it is within the scope of the present invention to provide a connection assembly to pivotally connect a first part of a molded plastic structure with a second part of the molded plastic structure. The first part of the structure would be provided with a support structure in the form of a pair of spaced elements such as elements 95 and the second part of the structure would be provided with an integrally molded pivoting structure such as pivoting structure 93. In the exemplary embodiment of the connection assembly 77 shown in FIG. 12, the first part of the molded plastic structure is represented by the fragmentary portion of the container 12 shown therein and the second part is represented by the fragmentary portion of the handle 16 shown therein. The support structure is represented by the pair of elements 95 shown in FIG. 12 integrally molded on the container 12.

The ground engaging structure 94 is best seen in FIG. 4. The ground engaging structure 94 can be moved with respect to the container 12 between (1) an operative position (shown, for example, in FIG. 4) extending downwardly and rearwardly from the container 12 and (2) a storage position (shown, for example, in FIG. 3) extending downwardly from and forwardly of the container 12.

When the ground engaging structure 94 is in its operative position, it is disposed (1) above the ground when a user is manually effecting movement of the container 12 by rolling the wheels 14 along the ground through the use of the handle 16 and (2) on the ground behind the ground engaging wheels 14 in stable stationary supporting relation to the container 12 and handle 16 when the handle is released.

The ground engaging structure 94 includes two legs 287, 289. The structure of one leg 287 of the ground engaging structure 94 is shown in FIG. 4. It can be appreciated that the structure of the other leg 289 of the ground engaging structure 94 is of mirror image configuration and so the discussion of leg 287 (and the structures associated therewith) is applicable to leg 289.

The leg 287 is preferably a molded plastic structure reinforced by integral ribs 130. A cross structure 132, preferably made of molded plastic and reinforced by ribs (not shown), extends between the legs 287, 289 to provide support therebetween. The ground engaging structure 94 is pivotally mounted to a support member 134 that supports an end of the axle 66 as shown, for example, in FIG. 1. Each support member 134 of the spreader is preferably made of tubular steel or other appropriate metal and is secured to the bottom 32 of the container 12 by the retainer member 71 and by a plurality of bolts 136 that extend through the bottom of the container 12 and through the retainer member 71.

Each leg 287, 289 of the ground engaging structure 94 defines a groove 138 that is configured to receive a portion of the associated support member 134. When the support member 134 is in groove 138, a bolt assembly 140 is tightened by turning the knob 141 to hold the ground engaging structure 94 rigidly in the operative position thereof. When the bolt assembly 140 is loosened, the ground engaging structure 94 can be moved out of engagement with the support member 134 by removing the leg from the groove 138 and the ground engaging structure 94 can be pivoted about a bolt (not shown) in the bolt assembly 140 to the storage position. The bolt assembly 140 can optionally be tightened to hold the engaging structure 94 in the storage position.

Each wheel 14 is preferably made of a molded plastic and is reinforced with integral molded ribs or radially extending reinforcing structures 142. Each wheel 14 is mounted to a respective end of the axle 66 by a plastic members 146 (best seen in FIG. 1) that press fit into secure engagement with a respective end of the axle 66.

The structure and operation of the opening control assembly 22 will now be considered. A control arm 150, preferably made of a molded plastic, is pivotally mounted to the handle member 86 by a rivet 152. The control arm 150 is constructed and arranged to enable a user to manually move the same between a starting position (shown, for example, in FIG. 1) and an operative holding position (shown in FIG. 11).

The flexible element 82 is connected between the control member 69 and the control arm 150 so that the spring bias of the control member 69 biases the control arm 150 away from the operative holding position.

The flexible element 82 is preferably comprised of a flexible multiple strand wire 153 encased in a sheath 155 (shown in FIG. 11) of plastic molded thereabout to form a flexible covering for the wire 153. The flexible element is guided by a groove 159 integrally formed on the bottom of the container and by an aperture 161 in a rear edge of the container 12 through which it passes.

Essentially, when the spreader user depresses or squeezes the control arm 150 causing the same to pivot from its starting position toward and into its operative holding position, the flexible element 82 is pulled thereby causing the control member 69 to move rearwardly against its spring bias to uncover the discharge openings 38 to allow the material in the container 12 to flow downwardly on the spreader disk 18.

Movement of the control arm 150 to its operative position will move the control member 69 partially or fully into its open position, depending on the effective length of the flexible element 82 therebetween. The flexible element 82 follows a path from the control arm 150 through an adjusting structure 158 to the control member 69. The adjusting structure 158 is constructed and arranged to selectively modify the path of the flexible element 82 to change the effective length of the flexible element 82.

The adjusting structure is constructed and arranged to be moved manually into a plurality of selected positions to cause the elongated element to follow a selected one of a plurality of paths of different lengths within the adjusting structure. Thus each position of the adjusting structure corresponds to a different effective path length of the flexible element. The effective path length of the flexible element determines the amount the discharge openings 38 are uncovered when the control arm 150 is depressed to its operative holding position. The effective length of the flexible element also determines the starting position of the control arm 150 when the control member 69 is in its fully closed position.

The distance between the starting position and the operative holding position of the control arm 150 determines the distance the control member 69 is moved away from the fully closed position thereof by the flexible element 82 in response to the movement of the control arm 150 from the starting position thereof into the operative holding position thereof to thereby determine the operative size or effective size of the discharge openings 38.

Figure 8:
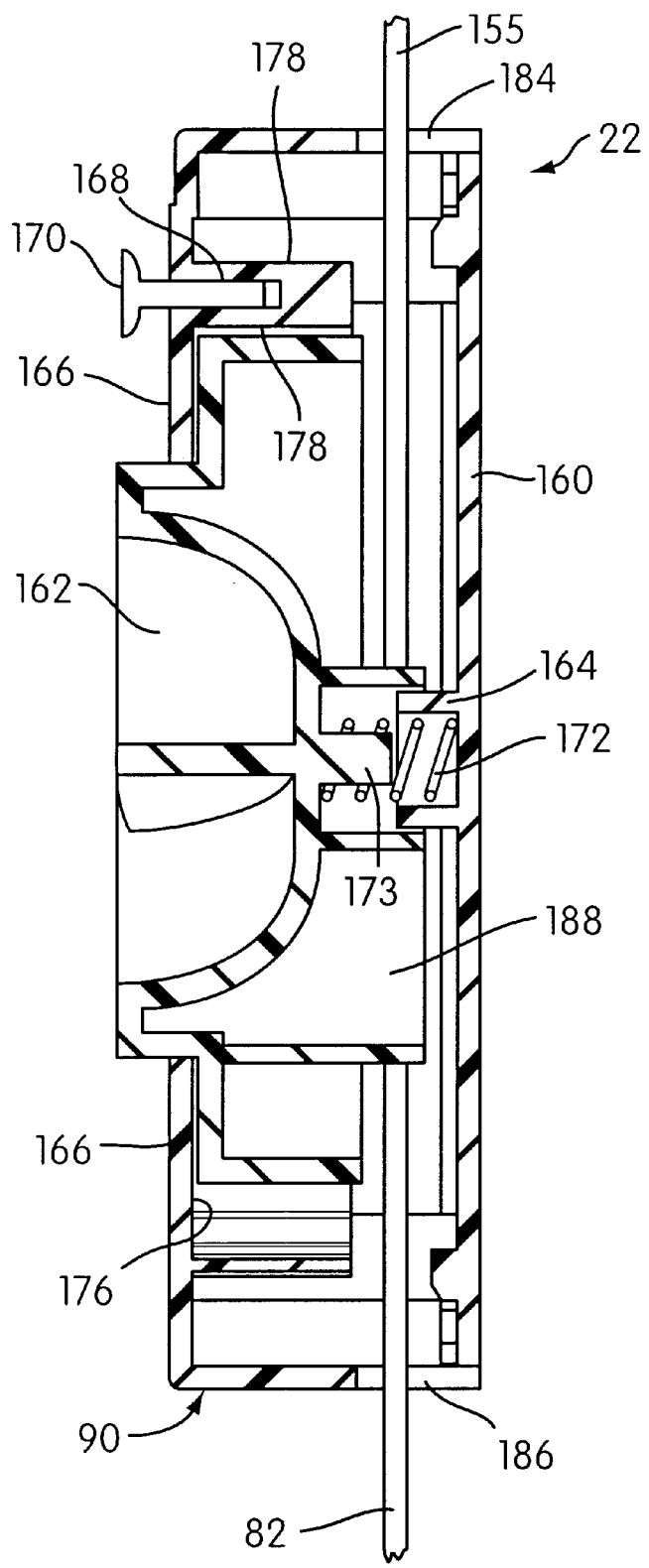
FIG. 8 is an enlarged fragmentary sectional view taken along the line 8—8 of FIG. 1.
Figure 9:
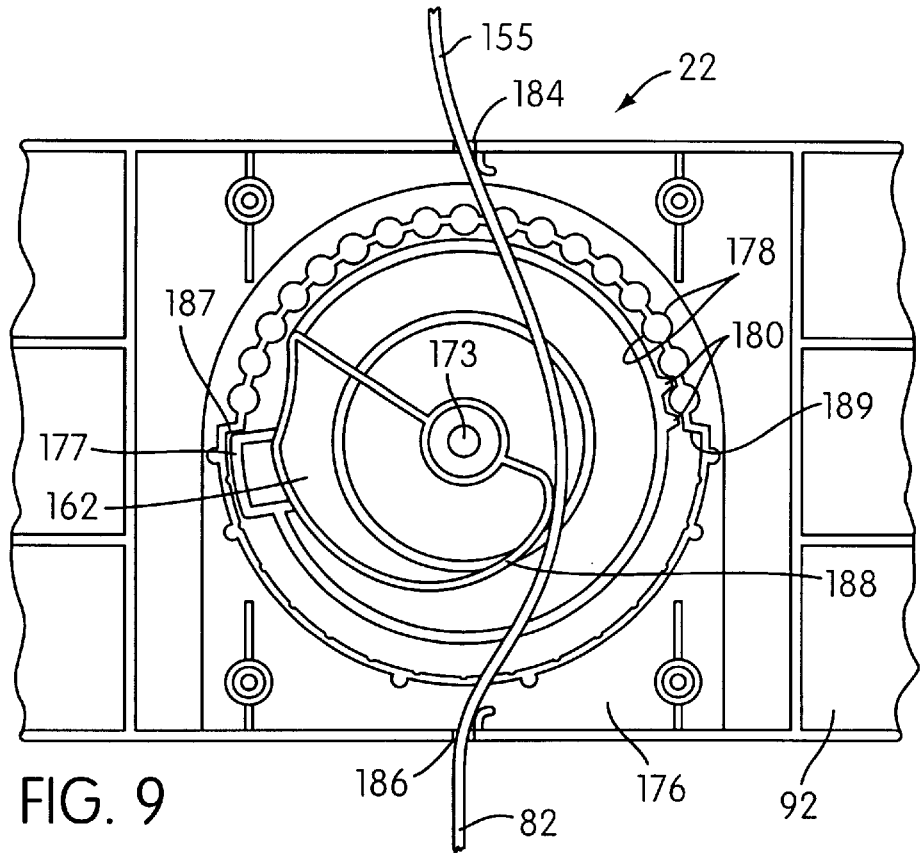
FIG. 9 is a fragmentary rear elevational view of the opening adjusting mechanism showing the same in a minimum opening position.
Figure 10:
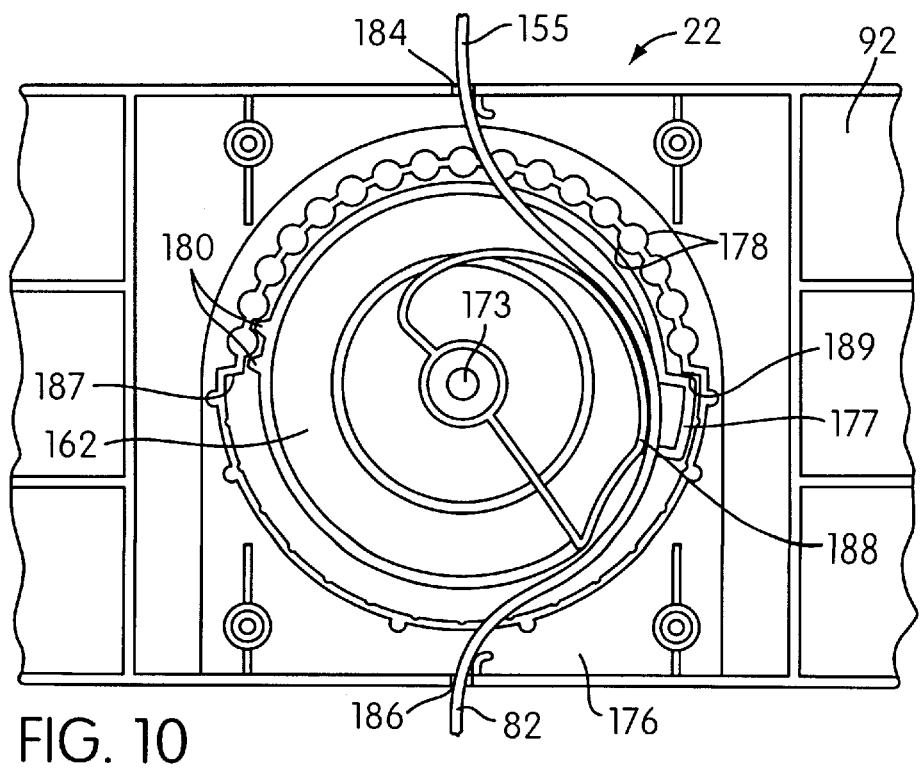
FIG. 10 is a view similar to FIG. 9 showing the opening adjusting mechanism in a maximum opening position.

The construction and operation of the adjusting structure 158 is appreciated from FIGS. 8–10. FIG. 8 shows a cross-section taken through line 8—8 in FIG. 1 and FIGS. 9–10 show the internal structures of the adjusting structure 158 after a back cover 160 thereof has been removed to view the adjusting structure 158 from the rear.

The adjusting structure 158 includes a forwardly facing rotary dial 162 mounted in the cross member 92 for manual movement about a rotary axis defined by an integral annular wall portion 164 on the cover 160 into a number of selected positions corresponding to a number of opening sizes effected by the control member 69 with respect to the discharge openings 38. A portion of the forward face 166 of the cross member 92 adjacent the dial 162 includes indicia corresponding to the opening sizes effected by the control member 69 when the dial 162 is in a position indicated by an index marking and the control arm 150 is moved to its operative holding position.

More particularly, the cross member 92 includes a number of peg receiving holes 168 corresponding to the opening size indicia of the control member 69 (when the control arm 150 is in the operative holding position) and a plurality of distinguishable pegs 170 (shown, for example, in FIGS. 1 and 8) corresponding to the number of different applications of spreadable material to be scheduled in one season. The pegs are removably mounted in the peg receiving holes 168 to indicate the opening size selected position of the rotary dial 162 for each application.

The rotary dial 162 is mounted on the cross member 92 for limited axial movement between an dial-holding indexed position and a turnable position. A conventional coil spring 172 mounted on a post 173 integrally formed on the dial 162 resiliently biases the rotary dial 162 into an indexed position. When the user wishes to rotate the dial 162, the user manually moves the rotary dial 162 axially inwardly from the indexed position thereof to the turnable position thereof before effecting the manual turning movement of the rotary dial into a different selected position.

An interior face 176 of the cross member 92 includes a plurality of inwardly directed arcuate wall portions 178 which surround and define the plurality of peg receiving holes 168 therein. The inwardly facing side of the dial 162 has two adjacent teeth 180 which are spaced to engage a selected arcuate wall portion 178 corresponding to a selected index position of the dial 162.

The dial 162 is biased in an axial direction such that the teeth 180 are normally spring biased into partially surrounding engagement with one of the arcuate wall portions 178 which prevents rotation of the dial 162. To rotate the dial 162, the same is pushed inwardly against the spring force of the coil spring 172 to move the teeth 180 inwardly out of engagement with an arcuate wall portion 178. The user can then freely turn the dial 162 in either direction within a range of dial movement allowed by a stop portion 177 integrally formed on the dial 162 to a desired index setting. When the dial 162 is released, the coil spring 172 biases the dial 162 axially outwardly toward the front face of the cross member 92 such that the teeth 180 engage an arcuate wall portion 178 associated with the selected index position of the dial 162.

It can be appreciated from FIGS. 8 and 9 that upper and lower apertures 184, 186, respectively, are provided in the cross member 92 so that the flexible element 82 can pass through the adjusting structure 158. The flexible element 82 engages an inwardly directed curved wall portion 188 on the dial 162 and this causes the flexible element 82 to deviate from a straight line path between the upper and lower apertures 184, 186. The amount of deviation from a straight line path of the flexible element 82 between the upper and lower apertures 184, 186 depends on the rotational position of the dial 162.

More particularly, FIG. 9 shows the dial 162 at a first end of its operating range indicated by the fact that the stop portion 177 engages an inwardly projecting wall portion 178 of the cross member 92. When the dial 162 is in this position, the curved wall portion 188 causes a moderate deviation from a straight line path of the flexible element 82 between the upper and lower apertures 184, 186.

FIG. 10 shows the configuration of the flexible element 82 within the adjusting structure 158 after the dial 162 has been rotated to an index position at the opposite end of its adjusted operating range of movement from that shown in FIG. 9 indicated by stop portion 177 contacting a wall portion 189 on the cross member similar to wall portion 187. It can be appreciated that as the dial 162 rotates to the position shown in FIG. 10, the curved wall portion 188 rotates therewith causing an increase in the amount of deviation in the path of the flexible element 82 between the upper and lower apertures 184, 186. This increases the path length of the flexible element 82 through the adjusting structure 158 and so has the effective of shortening the length of the flexible element 82 between the control arm 150 and the control member (it is understood that the actual length of the flexible element 82 does not change). This deviation in the path of the flexible element 82 from the control member 69 to the control arm 150 causes the control arm 150 to move the control member 69 to its fully open position when the control arm 150 is in its operative holding position.

In contrast, the dial position of the dial 162 in FIG. 9 causes a minimal deviation in the path of the flexible element 82 which shortens the path the flexible element 82 follows through the adjusting structure. This in turn causes an increase in the effective length of the flexible element 82 compared to the dial position in FIG. 10. Thus when the control arm 150 is moved fully to the operative holding position when the dial 162 is in the position shown in FIG. 9, the control member 69 is moved only slightly toward its fully opened position so that the discharge openings are almost completely covered to slowly meter the particulate matter on the disk.

Figure 11:
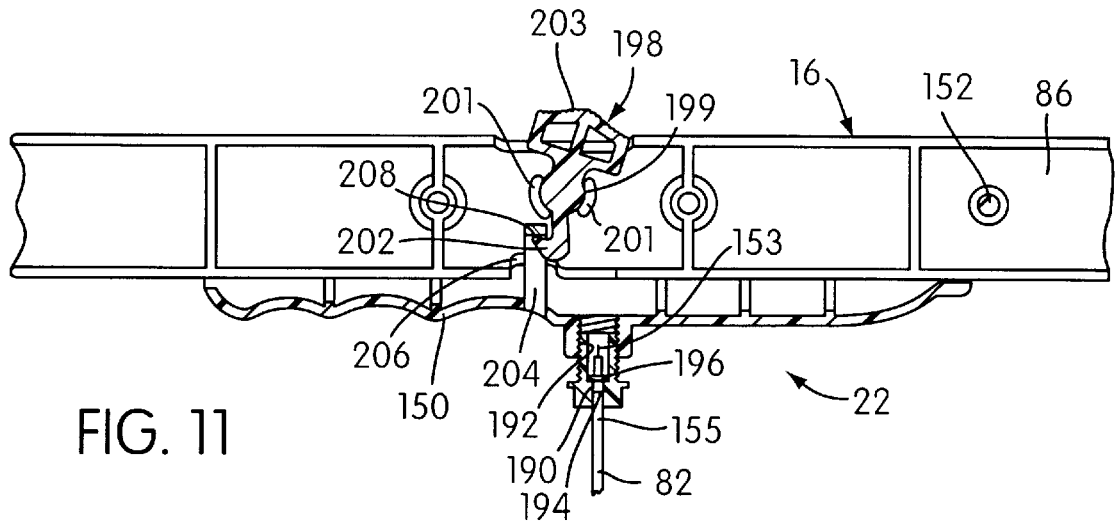
FIG. 11 is an enlarged fragmentary sectional view taken along the line 11—11 of FIG. 1 showing the components in a locked operative position.

FIG. 11 shows a cross-sectional view of the control arm 150 mounted on the handle member 86 and the flexible element 82 mounted on the control arm 150. It can be appreciated from FIG. 11 that the end of the flexible element 82 opposite the control member 69 terminates in a threaded adapter 190 that threadedly engages a threaded aperture 192 in the control arm 150. The flexible element 82 is held within an aperture 194 in the threaded adapter 190 by a metallic ring 196 crimped around the flexible element 82. It can be appreciated that the threaded adapter 190 can be adjusted to provide a degree of fine adjustment of the position of the control member 69 with respect to the discharge openings 38 when the dial 162 is in a given adjusted operating position and the control arm 150 is in its operative holding position.

FIG. 11 also shows that a releasable locking structure 198 is pivotally mounted in the hollow interior of the handle member 86 to hold the control arm 150 in its operative holding position. The releasable locking structure 198 is preferably an integral plastic structure. The pivotal mounting is accomplished by arcuate wall portions 199 on the locking structure 198 that are slidably held within complimentary arcuate wall portions 201 formed integrally on the interior of the handle member 86. The locking structure 198 has a thumb-engaging serrated end 203 and an integral hook member 202 on the opposite end thereof. The control arm 150 includes an essentially U-shaped member 204 that enters an aperture 206 in the handle member 86 when the control arm 150 is in the operative holding position. When the control arm is in its operative holding position, a cross portion, or byte portion, 208 of the U-shaped member 204 is positioned to hookingly engage the hook portion 202 of the lock structure 198 to hold the control arm 150 in the operative holding position. This allows the user to maintain the control member 69 in uncovered relation with the discharge openings 38 without holding the control arm. Thus, the user can push the spreader 10 along a given path spreading material without the necessity of manually holding the control arm 150 in its operative holding position, thereby preventing fatigue of the hand during use of the spreader 10. The control arm 150 can be quickly and easily released from its operative holding position by simply pivoting the releasable locking structure 198 with a thumb out of hooking engagement with the control arm.

To use the spreader 10 in the drop mode, the container 12 is filled with a selected material. The handle 58 is loosened and the elliptical skirt 24 is moved fully downwardly to move the mode determining member 26 into the drop mode position thereof to provide the four openings shown in FIG. 6 and the handle 58 is retightened. The dial 162 is adjusted in the manner described above to select a path length within the adjusting structure for the flexible element 82 that corresponds to the desired opening size effected by the control member 69 (when control arm 150 is depressed) for the selected material to be spread.

As the spreader 10 is pushed forwardly, the wheels 14, axle 66, gears 64, 68, shaft 60, spreader disk 18 and clearing member 62 rotate. The material is prevented from falling on the spreader disk 18 by the control member 69 which is in covering relation with the discharge openings 38 until the control arm 150 is moved to the operative position thereof.

At the location where the material is to be spread, the user depresses the control arm 150 to the operative position and pushes the spreader 10 along a path where material is to be applied. Depressing the control arm 150 tensions the flexible element 82 which moves the control member 69 rearwardly out of covering relation (partially or fully, depending on the dial 162 setting) with the discharge openings 38. As the spreader 10 rolls forwardly, the clearing member 62 rotates above the discharge openings 38 breaking up any clods of material to allow the material to fall through the uncovered openings 38.

As the material falls on the rotating spreader disk 18, it is distributed outwardly 360 degrees by the blades 19 against the inside surface of the elliptical skirt 24. The elliptical skirt 24 directs the material downwardly onto the ground to form a generally uniform particle pattern thereon as the spreader 10 moves forwardly. The operation of an elliptical skirt to effect uniform distribution of particulate matter is disclosed in the U.S. Pat. No. 4,032,074 referenced above which patent is hereby incorporated by reference in its entirety into the present application for all material disclosed therein.

When the user reaches the end of the path along which the material has been spread, the control arm 150 is released allowing the spring force of the springs 76 to move the control member 69 into covering relation with the discharge openings to stop the particle flow and to move the control arm 150 back to its starting position. The spreader 10 is moved until it is directed along a path immediately adjacent the path just covered with material and the user rolls the spreader 10 therealong with the control arm 150 again depressed. This procedure is followed until the ground is covered with material.

To use the spreader 10 in broadcast mode, the handle 58 is loosened and the elliptical skirt 24 is raised to move the same out of the outward path of the material discharged outwardly by the spreader disk 18. This moves the mode determining member 26 in the manner described above to its broadcast position and the handle 58 is retightened. The user selects the appropriate opening size to be effected by the control member when the control arm is depressed by rotating the dial 162 on the adjusting structure 158. The dial 162 position may correspond to a position of one of the pegs 170. Each peg is preferably made of plastic and can be press fit into a selected one of the plurality of holes 168 to retain the peg in the one hole and can be easily moved between peg receiving holes 168 by pulling the peg out and pushing it in another hole. The pegs can be made individually distinguishable by being, for example, color coded or marked by a number or letter, and can be positioned to mark preferred dial 162 settings which correspond to preferred control member 69 positions (i.e., corresponding to effective opening sizes of the discharge openings 38 when the control arm is moved to its operative position) for selected materials at various times of the year. The use of the pegs is optional and a convenience to the user. The pegs can be used to indicate preferred opening sizes in either mode of spreader operation.

With the container 12 containing particulate matter, the user rolls the container 12 along a path to be covered with material and depresses the control arm 150 to its operative position. This opens the control member 69 a desired degree to partially or completely uncover (depending of the dial 162 setting) the rearward pair 36 of discharge openings. As the spreader 10 rolls forwardly, the clearing member 62 rotates above the discharge openings 38 breaking up any clods of material to allow the material to fall through the uncovered openings 38.

Because the mode determining member 26 is in the broadcast mode, only the rearward pair 36 of openings direct material to the spreader disk 18. The material falls on the rotating spreader disk 18 at a position generally rearward of the axis 20 and the rotating blades 19 direct the material outwardly from the spreader 10 generally forwardly of and transversely to (in both directions) the direction of travel of the spreader 10 in a pattern less than 360 degrees and devoid of a rearward extent to avoid throwing material on the user walking behind the spreader 10.

It can be appreciated from FIG. 6 that one of the discharge openings 38, an opening separately designated by the reference number 205, is displaced slightly toward the longitudinally extending center axis of the spreader and slightly rearwardly of the other rear discharge opening 206. Displacing the opening 205 in this manner improves the symmetry of the particle distribution pattern achieved by the spreader when functioning in the broadcast mode and has no measurable adverse effect on the particle distribution pattern of the spreader when operating in the drop mode. The spreader disk 18 (not shown in FIG. 6) rotates clockwise in the view of the underside of the spreader shown in FIG. 6 when the wheels are rolling in the forward direction. Therefore it can be understood that displacing opening 205 as shown in FIG. 6 helps assure that particulate matter falling on the disk 18 is not thrown in a rearward direction relative to the direction of the forwardly moving spreader.

The spreader operates adequately with the discharge openings 38 symmetrically arranged with respect to the spreader disk 18 and so it is within the scope of the present invention to provide a dual mode spreader and an exclusively broadcast mode spreader in which the discharge openings 38 are symmetrically arrange with respect to the spreader disk. Furthermore, because the slight asymmetry of the discharge openings 38 in the preferred embodiment of the dual mode spreader does not significantly effect the operation and functioning of the spreader in the drop mode, the elliptical skirt of the present invention operates essentially as described in the incorporated '074 patent reference even though the spreader in the incorporated patent reference utilizes openings symmetrically arrange with respect to the rotating disk thereof.

At the end of the path where material has been spread, the user releases the control arm 150 to allow the coil springs 76 to move the control member 69 back into covering relation with the rearward pair 36 of discharge openings to stop the flow of material out of the container 12 and to move the control arm 150 back to the starting position thereof.

The spreader 10 is directed along a path generally parallel to the path just traversed and spaced an appropriate distance therefrom to avoid excessive overlap of material. The user depresses the control arm 150 and pushes the spreader 10 to the end of the second path and the control arm 150 is then released. This procedure is repeated until the area is covered with material.

One skilled in the art will appreciate that the releasable locking structure 198 can optionally be used by the spreader user at any time during the application of material at the discretion of the user in either mode of operation. The user simply moves the control arm 150 to the operative holding position thereof, pivots the releasable locking structure 198 so that the hooked end 202 hookingly engages the U-shaped member 204 and releases the control arm 150. The control arm 150 is maintained in the operative holding position thereof against the spring force of the coil springs 76 until the releasable locking structure 198 is moved to its releasing position by the user.

The spreader 10 is preferably made almost entirely of molded plastics so that the spreader 10 is generally lightweight, corrosion resistant, durable and easy to manufacture, transport and assemble. More particularly, the container 12, wheels 14, wheel mounting members 146, control member 69, mode determining member 26, handle 16, retainer structure 71, control arm 150, ground engaging structure 94, spreader disk 18, clearing member 62, elliptical skirt 24, gears 64, 68, housing 61, dial 162, cross member 92, handle member 86 and cover 160 are each preferably made of an appropriately selected molded plastic. It is understood, however, that any appropriate materials can be used to construct any of the structures of the spreader 10.

One skilled in the art will understand that the preferred embodiment of the spreader 10 shown in the figures and described herein is exemplary only and not intended to be limiting. It is within the scope of the present invention, for example, to incorporate the opening control assembly including the flexible element, the control member, the adjusting structure and the control arm; and the connection assembly in other types of spreaders, to control material flow and the pivotal positions of the handles thereof including exclusively drop mode-type spreaders and exclusively broadcast mode-type spreaders.

An example of a suitable drop mode spreader is shown in U.S. Design patent application Ser. No. 29/097,669, filed Dec. 11, 1998, and an example of a suitable broadcast mode spreader is disclosed in U.S. Design patent application Ser. No. 29,097,710, filed Dec. 11, 1998, both of which design applications are assigned to the assignee of the present application and both of which are hereby incorporated by reference in their entirety into the present application for all material disclosed therein.

It can also be appreciated that although it is preferred for the control member to be disposed immediately adjacent the discharge openings and for the mode determining member to be positioned between the control member and the retainer, it is within the scope of the present invention to provide an embodiment of the dual mode spreader in which the positions of the mode determining member and the control member are reversed, i.e., the mode determining member could be immediately adjacent the discharge openings and the control member could be between the mode determining member and the retaining structure.

Additional advantages and modifications of the present invention will readily occur to those skilled in the art. Therefore, the invention is not limited to the specific details and representative embodiment shown and described herein. Accordingly, various modifications to the embodiment may be made without departing from the spirit or scope of the invention as described by the appended claims.

What is claimed is:

1. A dual mode spreader comprising a container having structure to hold a supply of spreadable material;

ground-engaging wheels connected to said container to enable said wheels when rolled along the ground to carry the container over a ground area which is to receive the spreadable material;

a handle having structure constructed and arranged with respect to said container to enable a user gripping the handle to manually effect a movement of said container over a ground area by rolling said wheels along the ground;

a spreader disk mounted in a position below said container for rotational movement about an upright axis in response to the rolling of said wheels when said container is moved;

discharge openings in said container leading to said spreader disk enabling the spreadable material in said container to move therethrough onto said spreader disk to be distributed in a path outwardly thereof during the rotational movement of said spreader disk;

an elliptical skirt constructed and arranged to be moved generally vertically with respect to said container and spreader disk between (1) a broadcast position disposed above the path of distribution of the spreadable material by said spreader disk enabling the spreadable material to be broadcast onto a ground area and (2) a drop position disposed within the path of distribution of the spreadable material by said spreader disk to deflect the spreadable material to move downwardly onto a ground area from the periphery thereof;

a mode determining member constructed and arranged to be moved with respect to said container in coordinated relation with the movement of said skirt between (1) a broadcast mode wherein said mode distributing member cooperates with said discharge openings so as to cause the path of distribution of the spreadable material to extend outwardly of the spreader disk through an arc less than 360° which is devoid of an extent directly to the rear to thereby avoid distributing spreadable material on a user walking behind the container and (2) a drop mode wherein said mode determining member cooperates with said discharge openings so as to cause the path of distribution of the spreadable material to extend outwardly of the spreader disk 360° to enable the spreadable material to move downwardly from the entire periphery of said skirt; and an opening control assembly constructed and arranged with respect to said container to control the size of the discharge openings between fully closed and fully opened conditions when said mode determining member is in either mode thereof.

2. A dual mode spreader as defined in claim 1 wherein said spreader disk is mounted on a shaft which extends within said container and an opening clearing member is fixed on said shaft in a position above said discharge openings so as to move in clod clearing relation with said discharge openings when said container is moved.

3. A dual mode spreader as defined in claim 2 including rigid ground engaging structure constructed and arranged with respect to said container to be moved between (1) an operative position extending downwardly and rearwardly from said container and (2) a storage position extending downwardly and forwardly from said container, said rigid ground engaging structure when in said operative position being disposed (1) above the ground when a user is manually effecting movement of said container by rolling said wheels along the ground through the use of said handle and (2) on the ground behind the ground engaging wheels in stable stationary supporting relation to said container and handle when said handle is released.

4. A dual mode spreader as defined in claim 3 including a connection assembly constructed and arranged with respect to said handle and said container to enable said handle to be moved between (1) an operative position extending upwardly and rearwardly from said container and (2) a storage position extending downwardly in generally coextensive relation with said container and said rigid ground engaging structure when in the storage position thereof.

5. A dual mode spreader as defined in claim 4 wherein said handle includes a handle member configured and positioned to be gripped by the user when said handle is in the operative position thereof, a pair of side members extending from ends of said handle member and a cross member extending between intermediate portions of said side members.

6. A dual mode spreader as defined in claim 5 in which each handle connection assembly includes cooperating pairs of interengaging structures on said container and on a free end of the side members of said handle and a bolt assembly extending through each cooperating pair of interengaging structures interconnecting said handle with said container for pivotal movement between said operative and storage positions, each cooperating pair of interengaging structures including adjacent intercommunicating portions of polygonal interior cross-sectional configuration, each bolt assembly including a head having a portion of corresponding polygonal exterior cross-sectional configuration disposed (1) within said adjacent intercommunicating portions of the associated cooperating pair of interengaging structure when said bolt assembly is tightened to retain said handle in the operative position thereof with a positive mechanical blocking arrangement and (2) within only one of said adjacent intercommunicating portions of the associated cooperating pair of interengaging structures when said bolt is loosened to allow said handle to be moved between said operative and storage positions.

7. A dual mode spreader as defined in claim 6 wherein said discharge openings include forward and rearward pairs of openings disposed around the axis of rotation of said spreader disk with said forward pair being disposed forwardly thereof and the rearward pair being disposed rearwardly thereof, each member of said rearward pair of openings having a width substantially equal to the width of each member of said forward pair of openings, said mode determining member is of sheet-like construction including a generally horizontally extending portion having a configuration suitable to be disposed in (1) covering relation with said forward pair of openings when in the broadcast mode thereof and (2) uncovering relation to said forward pair of openings when in the drop mode thereof.

8. A dual mode spreader as defined in claim 7 wherein said mode determining member includes a rollingly bendable portion integrally connected at a generally horizontally disposed end with said horizontally extending portion and connected at a generally vertically disposed end thereof with said skirt.

9. A dual mode spreader as defined in claim 8 wherein said opening control assembly includes a control member of sheet-like configuration, said control member being disposed in abutting relation generally between said horizontally extending portion of said mode determining member and said container.

10. A dual mode spreader as defined in claim 9 wherein said opening control assembly includes a skeletonized retaining member fixed to said container with said control member and the horizontally extending portion of said mode determining member being between said retaining member and said container, and springs connected between said container and said control member.

11. A dual mode spreader as defined in claim 10 wherein said opening control assembly further includes a control arm mounted to said handle and constructed and arranged to enable a user to move said control arm manually from a starting position into an operative holding position and an elongated flexible element connected between said control member and said control arm so that the spring bias of said control member biases said control arm away from said operative holding position.

12. A dual mode spreader as defined in claim 11 wherein said opening control assembly further includes an adjusting structure constructed and arranged to be moved manually into a plurality of selected positions to cause said elongated element to follow a plurality of paths of different lengths between said control member and said control arm corresponding to the selected position into which said adjusting structure is manually moved, the length of the path of movement of said flexible element determining the starting position of said control arm when said control member is in the fully closed position thereof and wherein the distance between the starting position and the operative holding position of said control arm determines the amount of movement said control member is moved away from the fully closed position thereof by said elongated flexible element in response to the movement of said control arm from the starting position thereof into the operative holding position thereof, thereby determining the operative size of the discharge openings.

13. A dual mode spreader as defined in claim 12 wherein said adjusting structure includes a rotary dial mounted in said cross member for manual movement about a rotary axis into a number of selected positions corresponding with a number of opening sizes and indicia corresponding to the opening sizes of said selected positions.

14. A dual mode spreader as defined in claim 13 wherein said cross member includes a number of peg receiving holes corresponding to the opening size indicia and a plurality of distinguishable pegs corresponding to the number of different applications of spreadable material to be scheduled in one season removably mounted in said peg receiving holes to indicate the opening size selected position of said rotary dial for each application.

15. A dual mode spreader as defined in claim 14 wherein said rotary dial is mounted on said cross member for limited axial movement between an indexed position and a turnable position and a spring resiliently biasing said rotary dial into the indexed position thereof requiring a user to manually move said rotary dial from the indexed position thereof into the turnable position thereof before effecting the manual turning moving said rotary dial into a different selected position.

16. A spreader as claimed in claim 1 further including ground engaging structure made of molded plastic material constructed and arranged with respect to said container to be moved between an operative position extending downwardly and rearwardly from said container and a storage position wherein the ground engaging structure extends downwardly from said container in generally coextensive relation with said handle when in the storage position thereof, said ground engaging structure when in said operative position being disposed above the ground when a user is manually effecting movement of said container by rolling said wheels along the ground through the use of said handle and on the ground behind the ground engaging wheels in stable stationary supporting relation to said container and handle when the user releases the handle.

17. A spreader as defined in claim 16 wherein said container includes plastic handle connecting structure thereon and wherein said handle includes plastic container connecting structure thereon disposed in cooperating relation to said plastic handle connecting structure and wherein said spreader further includes releasably lockable handle pivot providing structure between said connecting structures constructed and arranged to enable the handle to be moved as aforesaid.

18. A spreader as defined in claim 17 wherein said plastic handle is U-shaped and includes two side members each having a free end defining a pivoting structure, said plastic handle connecting structure comprising pairs of integrally molded spaced elements, each pair of elements receiving therebetween a pivoting structure, said releasably lockable handle pivoting structure providing structure including a bolt assembly engaged with each pair of elements and the pivoting structure therebetween, said bolt assemblies being constructed and arranged to interconnect the handle with said container for relative pivotal movement bout a common axis provided by the bolt assemblies, each bolt assembly being movable with respect to said container and the handle between a tightened locking position wherein the associated pair of elements and the pivoting structure therebetween are positively prevented from being moved pivotally with respect to one another about said common axis and a loosened pivoting position wherein the handle and the container are capable of being moved pivotally with respect to one another about said common axis, one element of each pair of elements and the associated pivoting structure including communicating interior peripheral surfaces of noncircular configuration, each bolt assembly including a blocking structure having exterior peripheral surfaces complimentary to the associated interior peripheral surfaces and movable axially (1) into engagement with both of the associated interior peripheral surfaces when a bolt assembly is moved into the locking position thereof to positively prevent pivotal movement between the handle and container by virtue of the intersurface blocking relationship thereof and (2) out of engagement with the interior peripheral surface of said pivoting structure when said bolt assembly is moved into the loosened pivoting position thereof to enable the handle and container to be pivotally moved with respect to one another about said axis, each bolt assembly including a threaded shank and a nut threaded thereon so as to be tightened thereon during the movement of said bolt assembly into the tightened locking position thereof, each bolt assembly including a first stop surface fixed with respect to the shank thereof and a second stop surface movable with respect to the shank thereof into engagement with said first stop surface thereof by the threaded movement of said nut thereof when a bolt assembly is moved into the tightened locking position thereof to limit the squeezing action of the elements on said pivoting structure therebetween.

19. A spreader as defined in claim 18 wherein the blocking structure of each bolt assembly comprises a blocking member having a peripheral flange engaging the associated element and an exterior peripheral surface of polygonal cross-sectional configuration.

20. A spreader as defined in claim 19 wherein each blocking member has an axial opening therein through which the associated shank extends, each shank having a head portion on one end thereof, a first stop member defining the first stop surface of the associated bolt assembly threaded on said shank fixing the associated blocking member on said shank between said head portion and said first stop member, a second stop member defining the second stop surface of the associated bolt assembly having an annular flange engaging another of said elements, a central opening through which said shank extends and an end surface engaged by said nut.

21. A spreader comprising a container having structure to hold a supply of spreadable material;

ground-engaging wheels connected to said container to enable said wheels when rolled along the ground to carry the container over a ground area which is to receive the spreadable material;

a handle having structure constructed and arranged with respect to said container to enable a user gripping the handle to manually effect a movement of said container over a ground area by rolling said wheels along the ground;

discharge openings in said container enabling the spreadable material in said container to move therethrough;

a rotary member constructed and arranged with respect to said container to rotate in coordinated relation to the rolling of said wheels in cooperating relation with said discharge openings to effect distribution of the spreadable material held in said container passing through said discharge openings onto the ground area during the movement of the container;

an opening control member spring biased to move into a fully closed position with respect to said discharge openings, said openings control member being constructed and arranged to be moved from said fully closed position against the spring bias toward a fully opened position with respect to said discharge openings;

a control arm constructed and arranged to enable a user to manually move said control arm from a starting position into an operative holding position;

an elongated flexible element connected between said control member and said control arm so that the spring bias of said control member biases said control arm away from said operative holding position;

and an adjusting structure constructed and arranged to be moved manually into a plurality of selected positions to cause said elongated element to follow a plurality of paths of different lengths between said control member and said control arm corresponding to the selected position into which said adjusting structure is manually moved, the length of the path of movement of said flexible element determining the starting position of said control arm when said control member is in the fully closed position thereof;

the distance between the starting position and the operative holding position of said control arm determining the amount of movement said control member is moved away from the fully closed position thereof by said elongated flexible element in response to the movement of said control arm from the starting position thereof into the operative holding position thereof to thereby determine the operative size of the discharge openings.

22. A spreader as defined in claim 21 including rigid ground engaging structure constructed and arranged with respect to said container to be moved between (1) an operative position extending downwardly and rearwardly from said container and (2) a storage position extending downwardly and forwardly from said container, said rigid ground engaging structure when in said operative position being disposed (1) above the ground when a user is manually effecting movement of said container by rolling said wheels along the ground through the use of said handle and (2) on the ground behind the ground engaging wheels in stable stationary supporting relation to said container and handle when the user releases the handle.

23. A spreader as defined in claim 22 including a handle connection assembly constructed and arranged with respect to said handle and said container to enable the handle to be moved between (1) an operative position extending upwardly and rearwardly from said container and (2) a storage position extending downwardly in generally coextensive relation with said container and said rigid ground engaging structure when the ground engaging structure is in the storage position thereof.

24. A spreader as defined in claim 23 wherein said handle includes a handle member configured and positioned to be gripped by the user when said handle is in the operative position thereof, a pair of side members extending from ends of said handle member and a cross member extending between intermediate portions of said side members.

25. A spreader as defined in claim 24 in which said handle connection assembly includes cooperating pairs of interengaging structures on said container and on a free end of the side members of said handle and a bolt assembly extending through each cooperating pair of interengaging structures interconnecting said handle with said container for pivotal movement between said operative and storage positions, each cooperating pair of interengaging structures including adjacent intercommunicating portions of polygonal interior cross-sectional configuration, each bolt assembly including a head having a portion of corresponding polygonal exterior cross-sectional configuration disposed (1) within said adjacent intercommunicating portions of the associated cooperating pair of interengaging structure when said bolt assembly is tightened to retain said handle in one of the operative positions thereof with a positive mechanical blocking arrangement and (2) within only one of said adjacent intercommunicating portions of the associated cooperating pair of interengaging structures when said bolt is loosened to allow said handle to be moved between said operative and storage positions.

26. A spreader as defined in claim 25 wherein said adjusting structure includes a rotary dial mounted in said cross member for manual movement about a rotary axis into a number of selected positions corresponding with a number of opening sizes and indicia corresponding to the opening sizes of said selected positions.

27. A spreader as defined in claim 26 wherein said cross member includes a number of peg receiving holes corresponding to the opening size indicia and a plurality of distinguishable pegs corresponding to the number of different applications of spreadable material to be scheduled in one season removably mounted in said peg receiving holes to indicate the opening size selected position of said rotary dial for each application.

28. A spreader as defined in claim 27 wherein said rotary dial is mounted on said cross member for limited axial movement between an indexed position and a turnable position and a spring resiliently biasing said rotary dial into the indexed position thereof requiring a user to manually move said rotary dial from the indexed position thereof into the turnable position thereof before effecting the manual turning moving said rotary dial into a different selected position.

29. A spreader as defined in claim 28 wherein said rotary member comprises a spreader disk mounted in a position below said container for rotation about an upright axis so that the spreadable material moving through the discharge opening of said container is received thereon and distributed outwardly thereof.

30. A spreader comprising a container having structure to hold a supply of spreadable material;

ground-engaging wheels connected to said container to enable said wheels when rolled along the ground to carry the container over a ground area which is to receive the spreadable material;

a handle having structure constructed and arranged with respect to said container to enable a user gripping the handle to manually effect a movement of said container over a ground area by rolling said wheels along the ground;

discharge openings in said container enabling the spreadable material in said container to move therethrough;

an opening control assembly constructed and arranged with respect to said container to control the size of the discharge openings between fully closed and fully opened conditions;

said opening control assembly including an adjusting structure constructed and arranged to be moved manually into a number of selected positions determining a number of different opening size conditions between said fully closed and fully opened conditions;

indicia cooperating with said adjusting structure for indicating an opening size condition corresponding to each selected position thereof;

a plurality of individually movable elements distinguishable with respect to one another sufficient to indicate to the user a plurality of different applications of spreadable material to be made in one season; and structure configured to selectively mount said individually movable elements in opening size indicating relation with said indicia.

31. A spreader as defined in claim 30 wherein said rotary member comprises a spreader disk mounted in a position below said container for rotation about an upright axis so that the spreadable material moving through the discharge opening of said container is received thereon and distributed outwardly thereof.

32. A connection assembly comprising, a first molded plastic part having a support structure in the form of a pair of spaced integrally molded elements, a second molded plastic part having an integrally molded pivoting structure disposed between said pair of spaced elements, and a bolt assembly constructed and arranged with respect to said structures to interconnect said structures for relative pivotal movement about an axis provided by said bolt assembly, said bolt assembly being movable with respect to said structures between a tightened locking position wherein said structures are positively prevented from being moved pivotally with respect to one another about said axis and a loosened pivoting position wherein said structures are capable of being moved pivotally with respect to one another about said axis, said pivoting structure and an adjacent element of said support structure including communicating interior peripheral surfaces of non-circular configuration, said bolt assembly including a blocking structure having exterior peripheral surfaces complementary to said interior peripheral surfaces movable axially (1) into engagement with both of said interior peripheral surfaces when said bolt assembly is moved into the locking position thereof to positively prevent pivotal movement between said structures by virtue of the intersurface blocking relationship thereof and (2) out of engagement with the interior peripheral surface of said pivoting structure when said bolt assembly is moved into the loosened pivoting position thereof to enable said structures to be pivotally moved with respect to one another about said axis, said bolt assembly including a threaded shank and a nut threaded thereon so as to be tightened thereon during the movement of said bolt assembly into said tightened locking position, said bolt assembly including a first stop surface fixed with respect to said shank and a second stop surface movable with respect to said shank into engagement with said first stop surface by the threaded movement of said nut when said bolt assembly is moved into said tightened locking position to limit the squeezing action of the elements of said supporting structure on said pivoting structure therebetween.

33. A releasably lockable connection as defined in claim 32 wherein the blocking structure of said bolt assembly comprises a blocking member having a peripheral flange engaging one of said support structure elements and an exterior peripheral surface of non-circular cross-sectional configuration.

34. A releasably lockable connection as defined in claim 33 wherein said blocking member has an axial opening therein through which said shank extends, said shank having a head on one end thereof, a first stop member defining said first stop surface threaded on said shank fixing said blocking member on said shank between said head and said first stop member, a second stop member defining said second stop surface having an annular flange engaging another of said support structure elements, a central opening through which said shank extends and an end surface engaged by said nut.

* * * * *